United States Patent [19]

Komazawa et al.

[11] Patent Number: 5,210,657
[45] Date of Patent: May 11, 1993

[54] OPTICAL ATTENUATOR APPARATUS WITHOUT STEEP LEVEL VARIATION

[75] Inventors: Hiroshi Komazawa; Fuminobu Ito; Kenichiro Umesaki, all of Atsugi; Yuuichi Watanabe, Odawara; Yoshiharu Sasaki, Fujinomiya, all of Japan

[73] Assignee: Anritsu Corporation, Tokyo, Japan

[21] Appl. No.: 834,168

[22] Filed: Feb. 11, 1992

[30] Foreign Application Priority Data

Feb. 15, 1991 [JP] Japan .................................. 3-42176
Feb. 25, 1991 [JP] Japan .................................. 3-50147
Dec. 17, 1991 [JP] Japan .................................. 3-353000

[51] Int. Cl.$^5$ .............................................. G02B 5/22
[52] U.S. Cl. .................................. 359/885; 359/889; 250/205; 362/293
[58] Field of Search ............... 359/885, 887, 888, 889, 359/890, 891; 250/205, 227.11, 227.23; 362/281, 293

[56] References Cited

U.S. PATENT DOCUMENTS

| 2,960,911 | 11/1960 | Coote et al. | 359/889 |
| 4,443,696 | 4/1984 | Taboada | 250/265 |
| 4,800,474 | 1/1989 | Bornhorst | 359/889 |
| 4,984,143 | 1/1991 | Richardson | 359/888 |

FOREIGN PATENT DOCUMENTS

1240293 9/1964 Fed. Rep. of Germany .
0160205 11/1985 Fed. Rep. of Germany .
2074339 10/1981 United Kingdom .

OTHER PUBLICATIONS

Applied Optics, vol. 19, No. 14, Jul. 15, 1980, pp. 2408-2412; New York, New York, Computer-Controllable Wedged-Plate Optical Variable Attenuator, R. Bennett, R. Byer.

Primary Examiner—Loha Ben
Attorney, Agent, or Firm—Frishauf, Holtz, Goodman & Woodward

[57] ABSTRACT

A first optical attenuation filter is arranged in a predetermined optical path and attenuates light to be attenuated with a first variable attenuation amount. A second optical attenuation filter is arranged in the predetermined optical path and attenuates, with a second variable attenuation amount, the light which has been transmitted through the first optical attenuation filter. The first and second optical attenuation filters can be driven in the forward and reverse directions and each has an attenuation amount characteristic which changes monotonously in both the forward and reverse directions. An attenuation amount setting section sets a desired attenuation amount to the light to be attenuated. First and second drivers are coupled to drive the first and second optical attenuation filters in the forward and reverse directions, respectively. A controller controls driving directions and driving amounts of the first and second optical attenuation filters through the first and second drivers in accordance with the desired attenuation amount so that an algebraic sum of the first and second attenuation amounts finally becomes equal to the desired attenuation amount and a variation in attenuation amount is decreased as a whole, thereby providing a smooth attenuation characteristic.

16 Claims, 30 Drawing Sheets

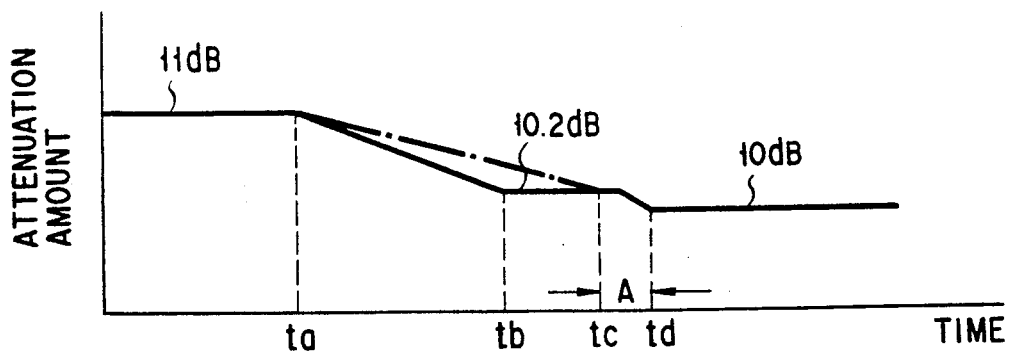
F I G. 4A
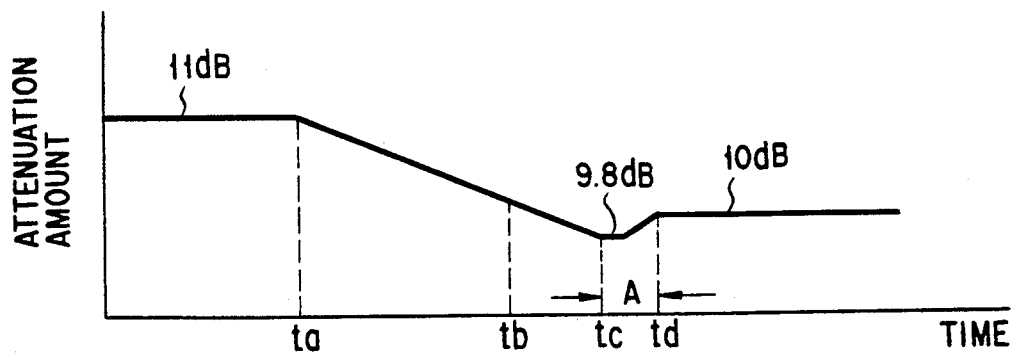
F I G. 4B
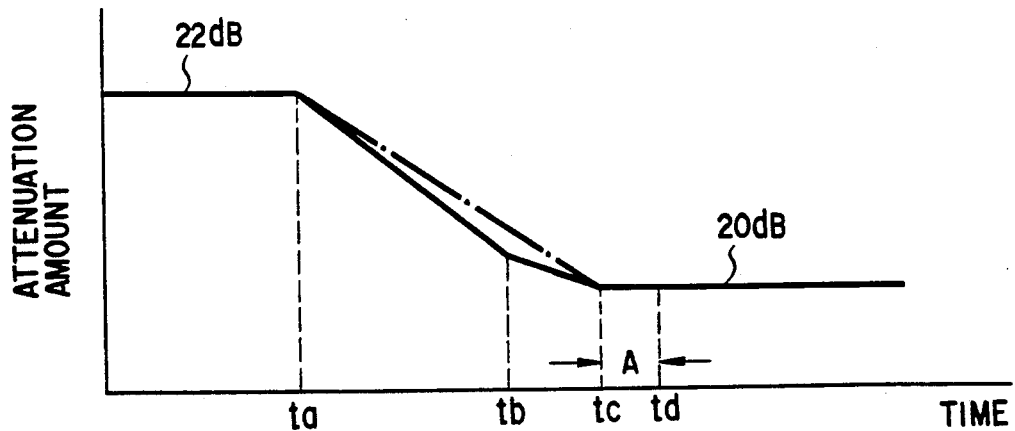
F I G. 4C

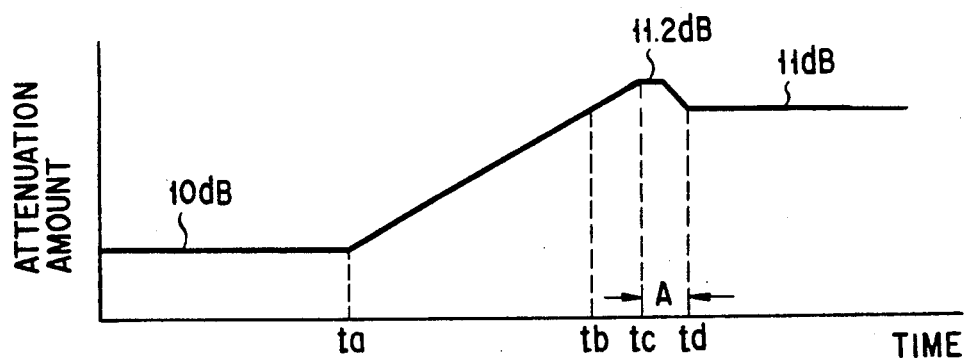
F I G. 8A
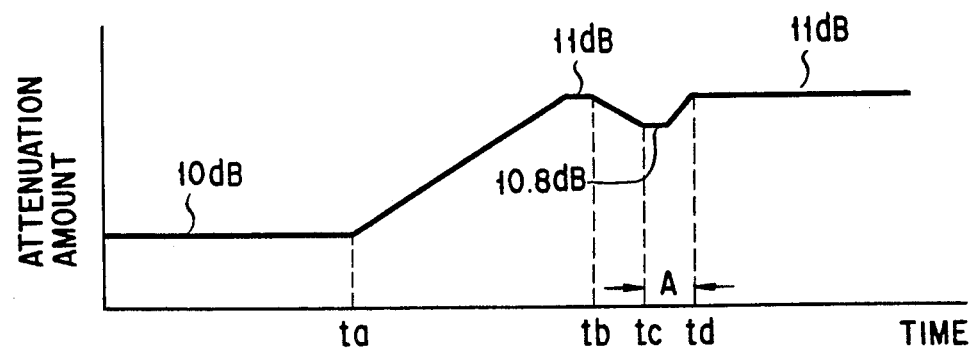
F I G. 8B
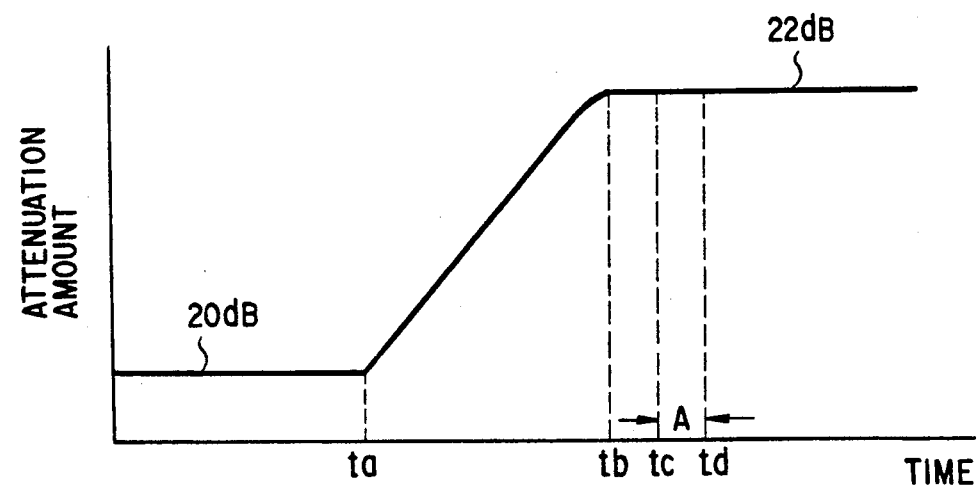
F I G. 8C

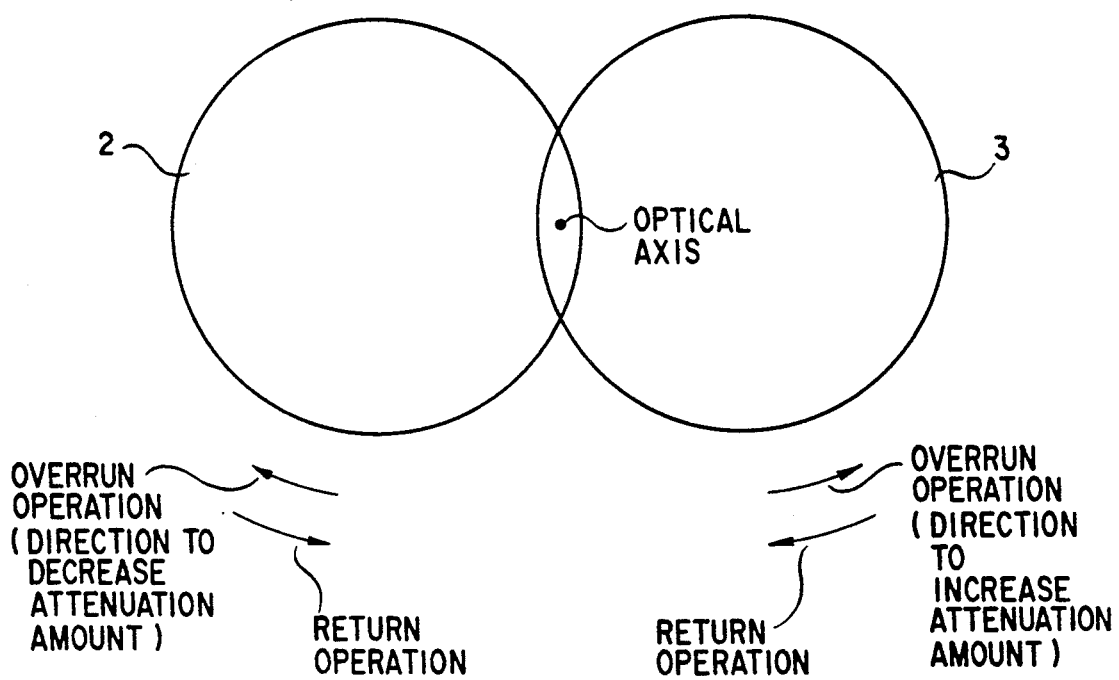
F I G. 10

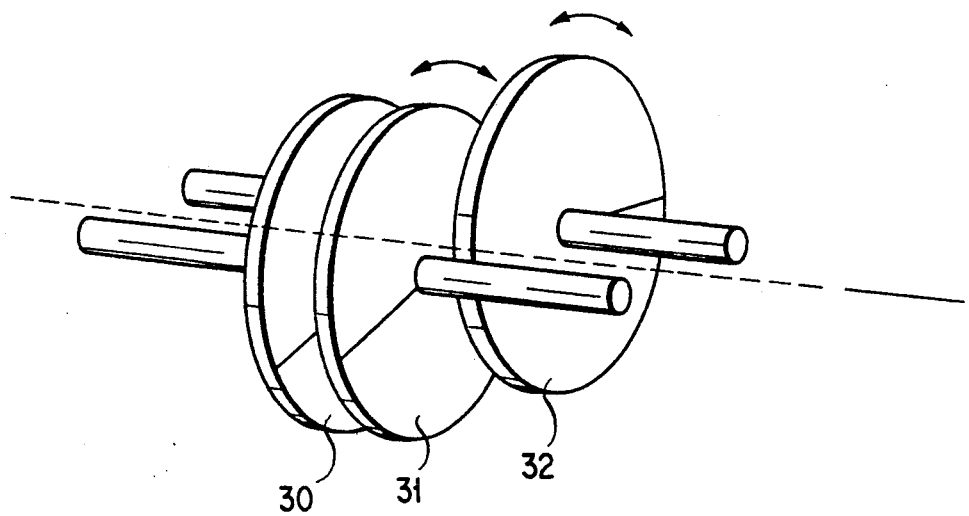
F I G. 13
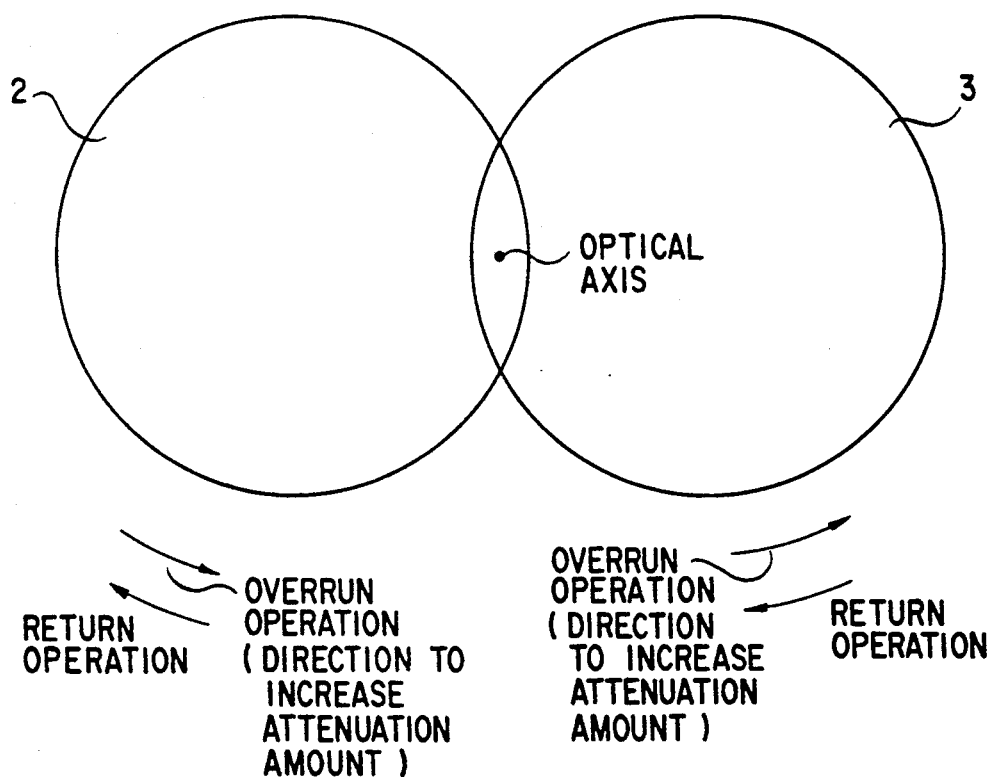
F I G. 15

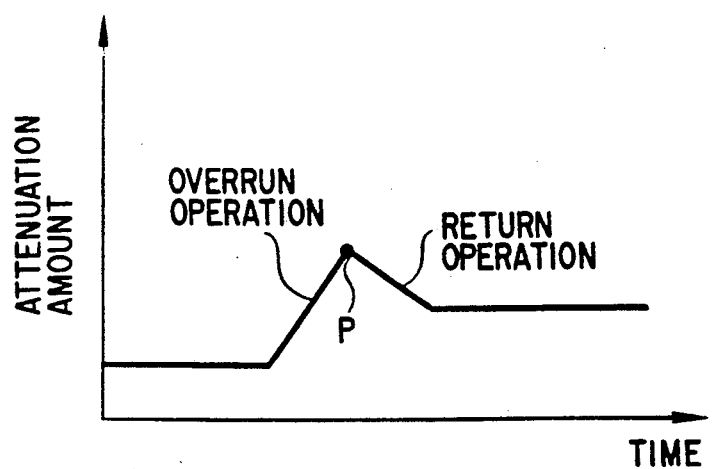
F I G. 16A
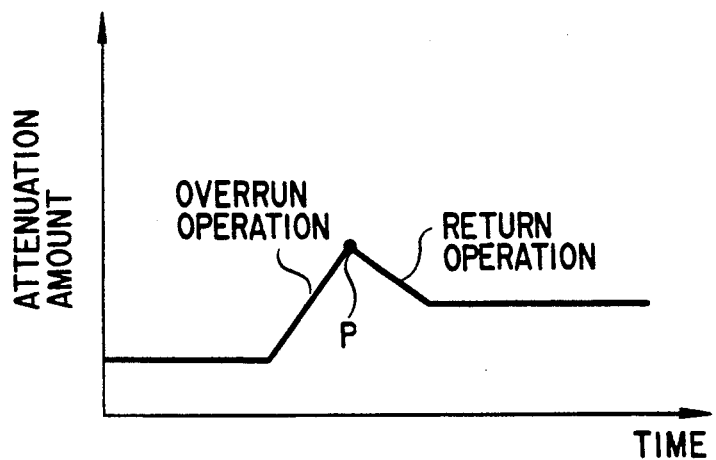
F I G. 16B
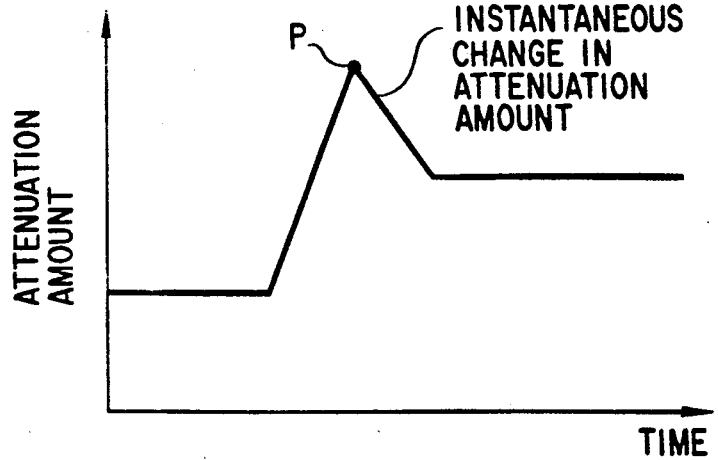
F I G. 16C

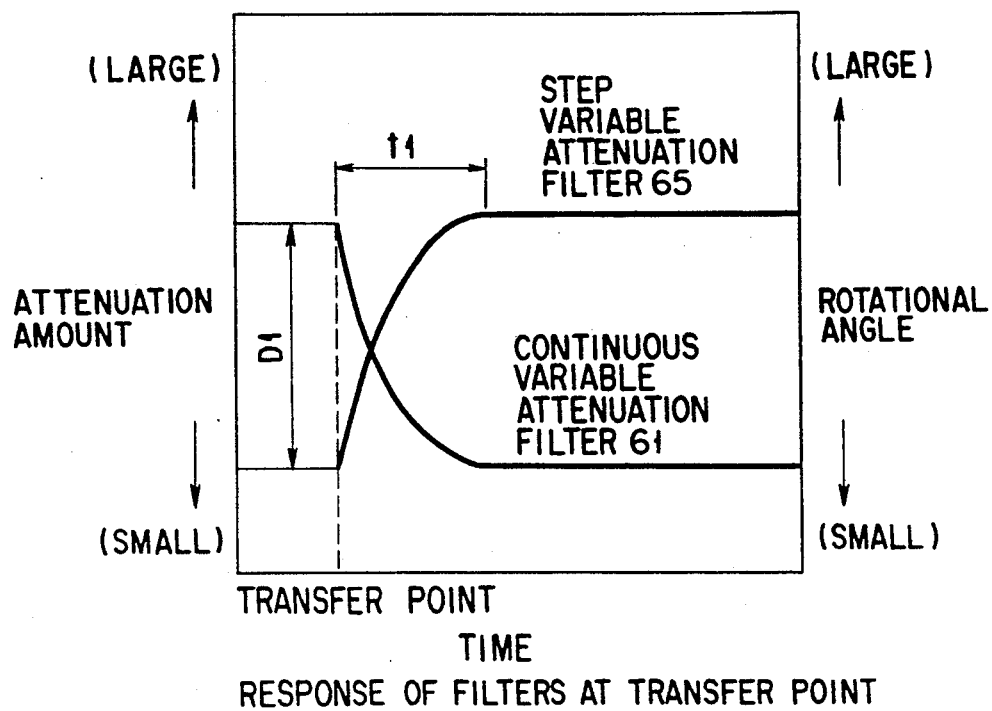
RESPONSE OF FILTERS AT TRANSFER POINT
F I G. 21A
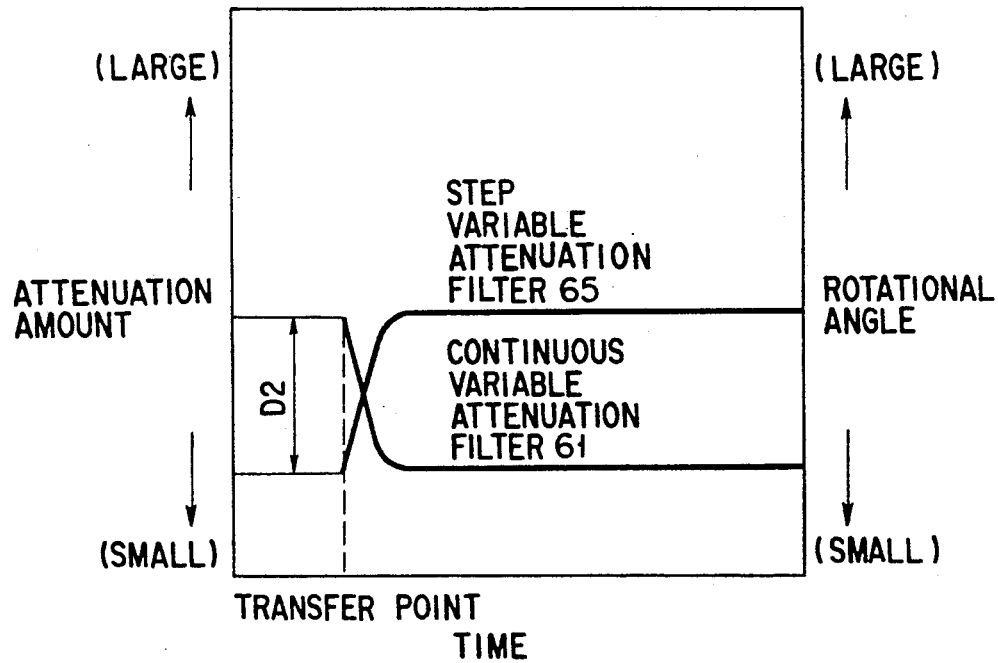
WHEN D1 → D2
F I G. 21B

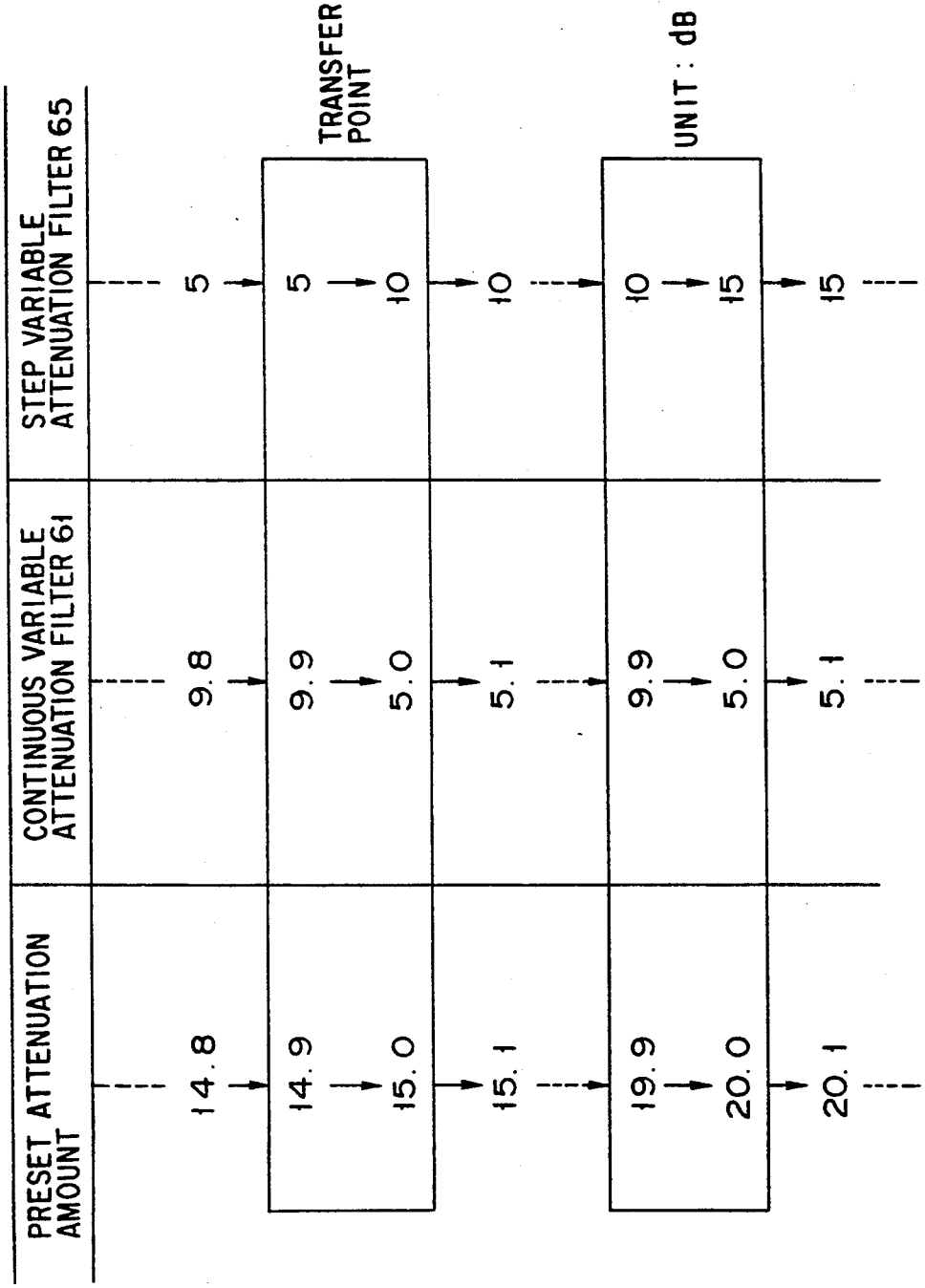

| CONTINUOUS VARIABLE ATTENUATION FILTER | STEP VARIABLE ATTENUATION FILTER | CHANGE IN PRESET ATTENUATION AMOUNT |
|---|---|---|
| 9.9 | 5.0 | 14.9 |
| 9.802 | 5.1 | 14.902 |
| 9.704 | 5.2 | 14.904 |
| 9.606 | 5.3 | 14.906 |
| 9.508 | 5.4 | 14.908 |
| 9.410 | 5.5 | 14.910 |
| ⋮ | ⋮ | ⋮ |
| 8.920 | 6.0 | 14.920 |
| ⋮ | ⋮ | ⋮ |
| 7.940 | 7.0 | 14.940 |
| ⋮ | ⋮ | ⋮ |
| 6.960 | 8.0 | 14.960 |
| ⋮ | ⋮ | ⋮ |
| 5.980 | 9.0 | 14.980 |
| ⋮ | ⋮ | ⋮ |
| 5.000 | 10.0 | 15.000 |

UNIT : dB

F I G. 22B

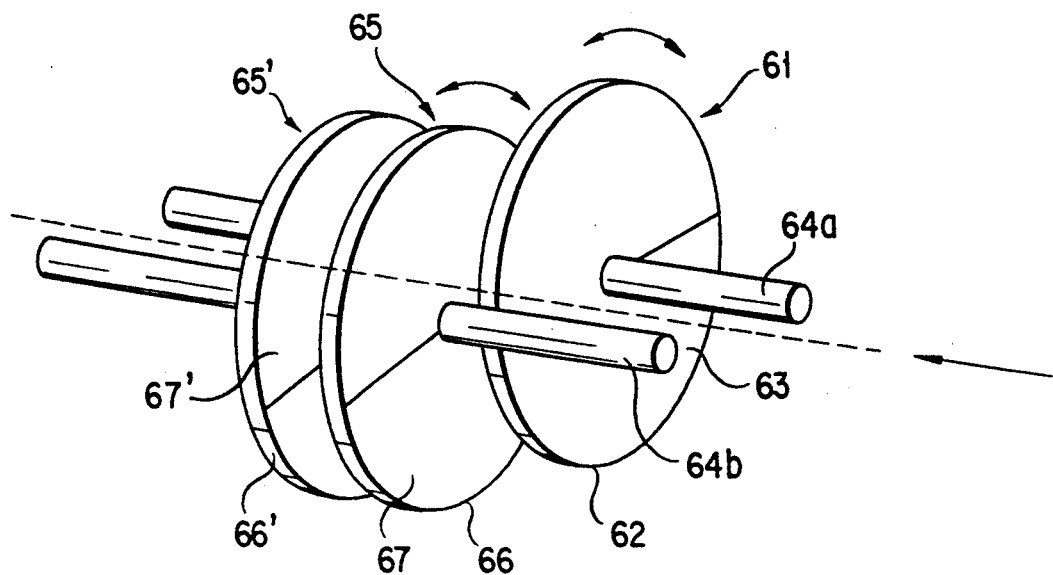
F I G. 23
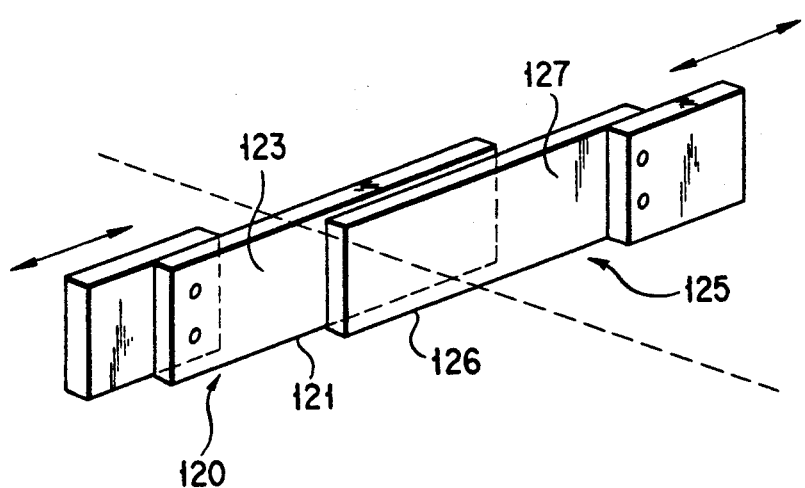
F I G. 24

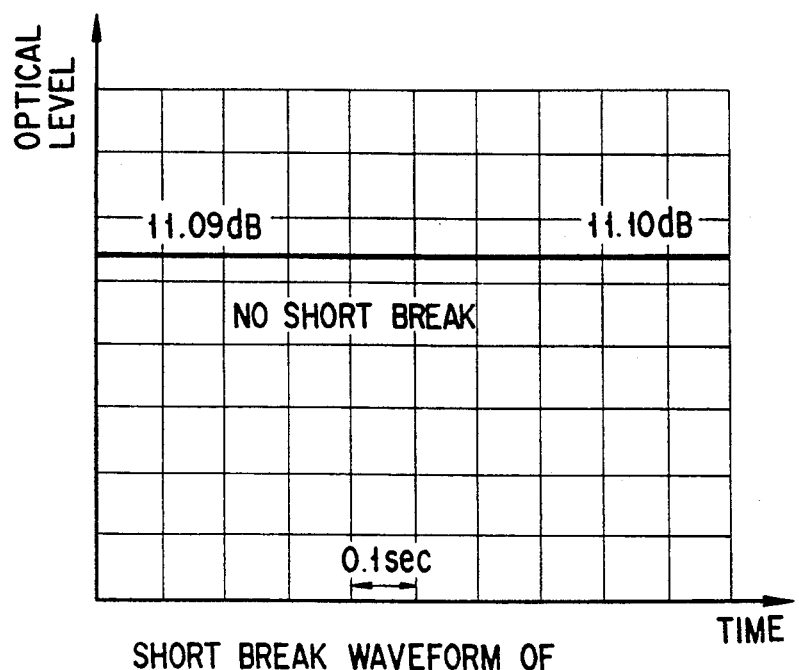
SHORT BREAK WAVEFORM OF
APPARATUS OF INVENTION
F I G. 27A
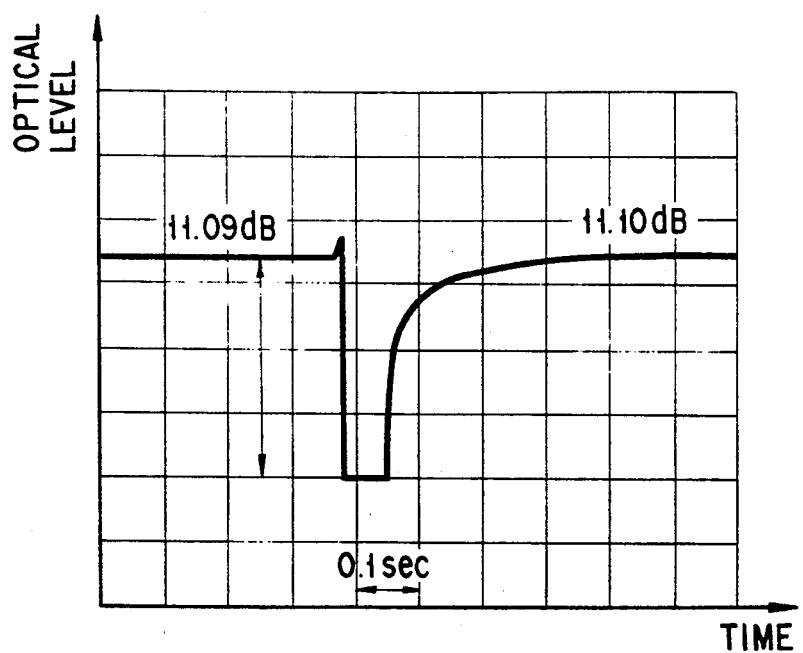
SHORT BREAK WAVEFORM OF
CONVENTIONAL APPARATUS
F I G. 27B

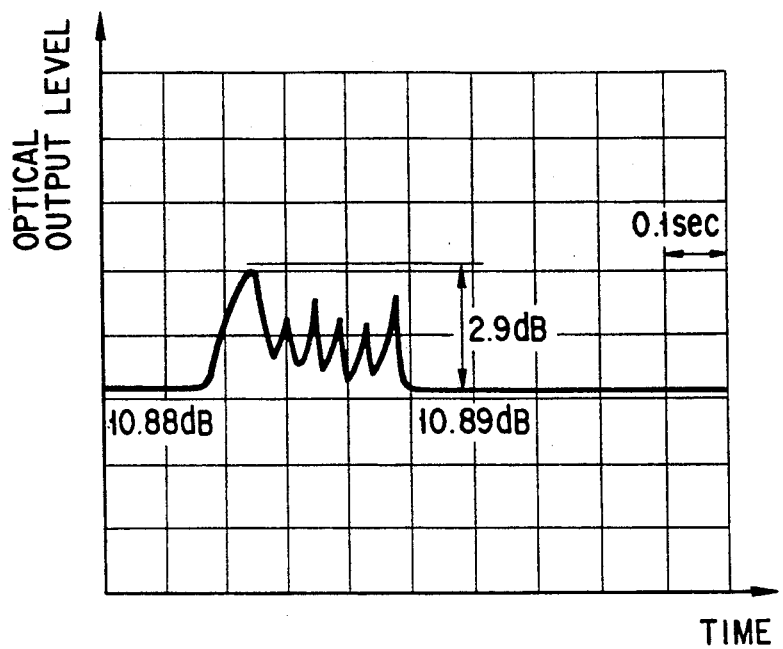
SHORT BREAK WAVEFORM OF
CONVENTIONAL APPARATUS
F I G. 27C
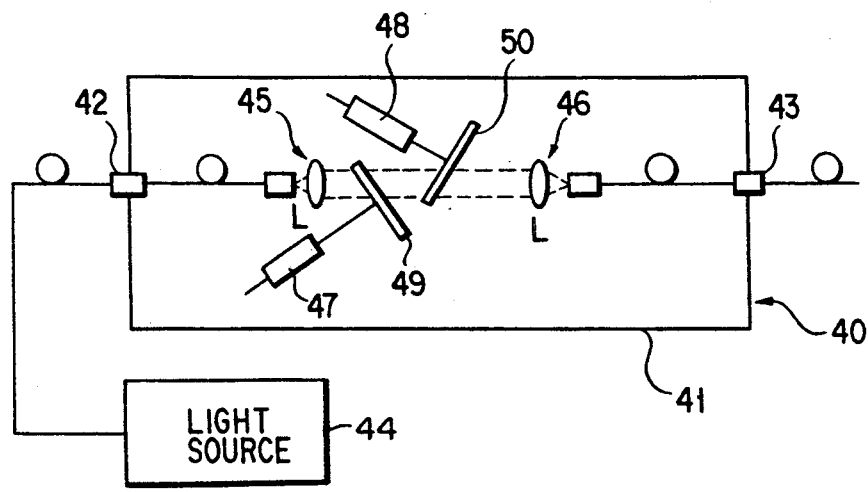
F I G. 28

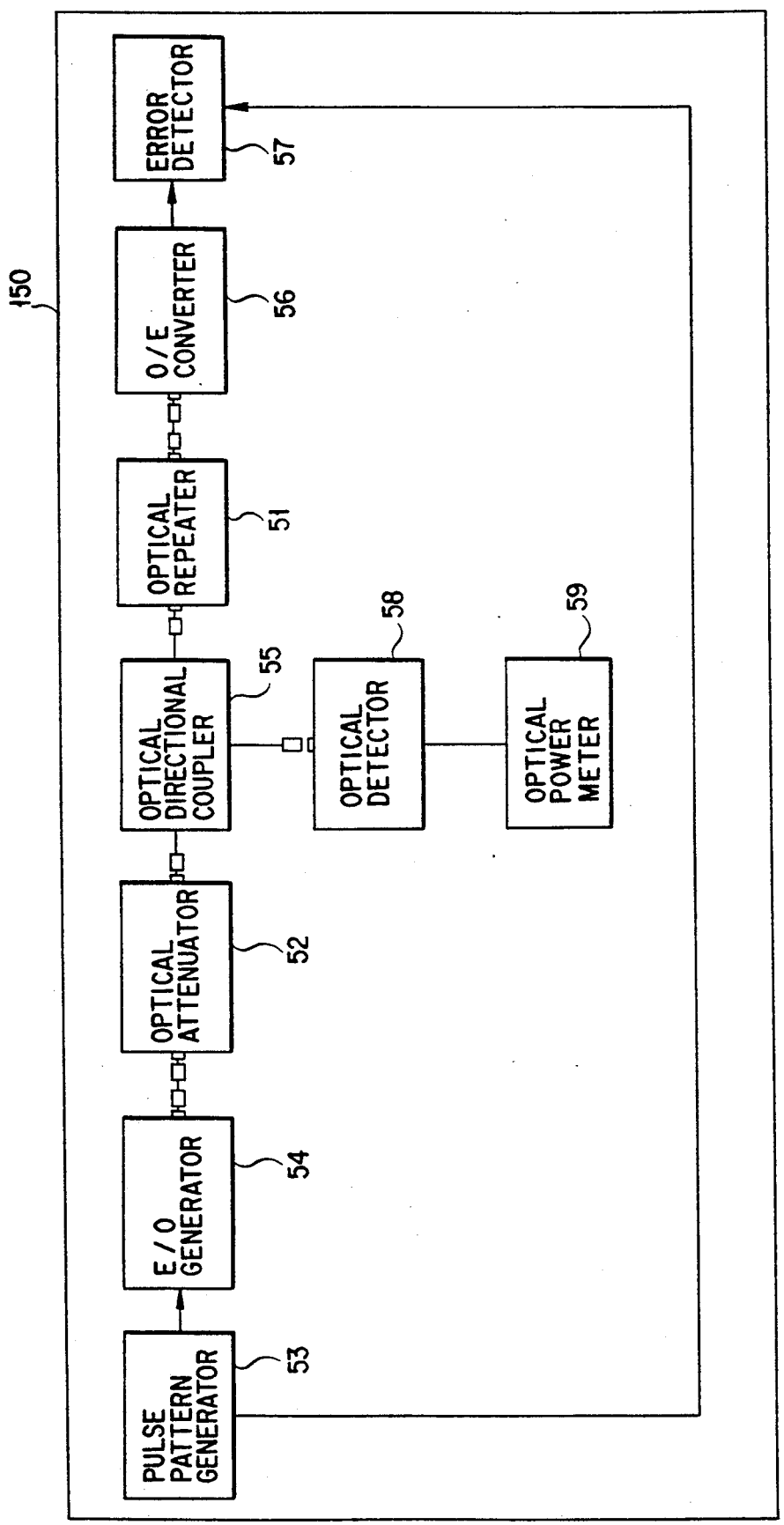
F I G. 34

OPTICAL ATTENUATOR APPARATUS WITHOUT STEEP LEVEL VARIATION

BACKGROUND OF THE INVENTION

1. Field of the Invention

The present invention generally relates to an optical attenuator apparatus and, more particularly, to an optical attenuator, used in optical communication, for attenuating light incident from a light source by a desired amount and outputting attenuated light so as to prevent optical level variation during attenuation amount switching.

2. Description of the Related Art

FIG. 28 shows a general schematic arrangement of an optical attenuator 40 used in optical communication.

Schematically, the optical attenuator 40 has incident- and exit-side connectors 42 and 43 provided to two sides of an attenuator body 41, two sets of lenses 45 and 46 for collimating light supplied from a light source 44 to the incident-side connector 42 and guiding parallel light to the exit-side connector 43, and two attenuation filters 49 and 50, arranged on the optical path between the lenses 45 and 46, for attenuating light by a desired amount and outputting the attenuated light to the exit-side connector 43.

As the attenuation filters 49 and 50, those shown in FIGS. 29 and 30 are conventionally generally used.

More particularly, attenuation filters 49 and 50 shown in FIG. 29 have attenuation plates 49a and 50a. In the attenuation plate 49a, a metal film whose transmittance changes continuously in the circumferential direction is formed on a disc-shaped glass substrate in order to obtain continuous attenuation amounts (e.g., 0 to 10 dB). In the attenuation plate 50a, filters 50aa having predetermined different attenuation amounts are provided at several portions of a disc-shaped metal substrate in order to obtain a plurality of fixed attenuation amounts (e.g., 10, 20, ..., 50 dB). The attenuation plates 49a and 50a are arranged to partially overlap each other on an optical path along which light is transmitted.

Attenuation filters 49 and 50 shown in FIG. 30 have attenuation plates 49b and 50b. In the attenuation plate 49b, a metal film whose transmittance changes continuously along the circumferential direction is formed on a disc-shaped glass substrate to obtain continuous attenuation amounts (e.g., 0 to 10 dB). In the attenuation plate 50b, a plurality of filters 50bb having predetermined fixed attenuation amounts are provided on a disc-shaped glass substrate at predetermined angular intervals to obtain a plurality of fixed attenuation amounts (e.g., 10, 20, ..., 50 dB). The attenuation plates 49b and 50b are arranged to partially overlap each other on an optical path along which light is transmitted.

In FIG. 28, to attenuate light, supplied from the light source 44 and incident through the incident-side connector 42, by the attenuation filters 49 and 50 described above and output the attenuated light from the exit-side connector 43, the respective attenuation plates 49a, 49b, 50a, and 50b are rotated by drive sections 47 and 48, e.g., motors, to positions to obtain a desired attenuation amount.

However, in the optical attenuator 40 using the conventional attenuation filters 49 and 50 shown in FIG. 30, when the attenuation plates 49a and 50a are rotated to vary the attenuation amount, the optical path is blocked by the metal substrate of the attenuation plate 50a, and the attenuation amounts at the blocking portions become infinite, as shown by the attenuation characteristic of FIG. 31. This blocking occurs every time the attenuation plate is rotated to switch the attenuation amount.

In the optical attenuator 40 using the conventional attenuation filters 49 and 50 shown in FIG. 30, since the glass substrates are used in both the attenuation plates 49b and 50b, light blocking described above does not occur. However, a level variation occurs at transfer portions of the respective fixed attenuation amounts of the attenuation plate 50b, as shown by the attenuation characteristic shown in FIG. 32. Level variation differs depending on a difference in attenuation amount from the adjacent attenuation plate 49b and occurs inevitably at transfer portions.

In the optical attenuator 40 of this type, although not shown, the main shafts of the respective attenuation filters 49 and 50 are coupled to the main shafts of drive sections 47 and 48 each comprising a motor and an angular position detecting potentiometer which outputs a rotational angle of the corresponding attenuation filter as a voltage signal obtained from a change in resistance of a variable resistor.

When the drive sections 47 and 48 are operated to rotate the corresponding attenuation filters 49 and 50 by desired amounts and stop, the respective attenuation filters 49 and 50 are stopped by a rotational friction force of the drive sections 47 and 48 within a range of play of the drive sections 47 and 48, and a backlash always occurs. The backlash is caused mainly by the hysteresis of the potentiometer.

FIG. 33 shows a relationship between a preset angle (shift amount) and an attenuation amount obtained when the attenuation filter of the optical attenuator having a backlash caused by hysteresis of a potentiometer is continuously rotated in the forward direction, and a relationship between a preset angle and an attenuation amount obtained when the attenuation filter is continuously rotated in the reverse direction.

More specifically, an error of about, e.g., 0.05 to 0.2 dB occurs between the attenuation amounts obtained when the attenuation filter is rotated in the forward and reverse directions even when the preset angles are the same, as shown in FIG. 33. In other words, the influence of the backlash appears to exhibit the same attenuation amount even if the shift amounts of the potentiometer are different ($D_b$ and $D_a$).

When the two attenuation filters 49 and 50 are controlled to obtain a desired attenuation amount, no problem occurs if the respective attenuation filters 49 and 50 are constantly rotated only in the forward or reverse direction. However, to obtain a desired attenuation amount within a short period of time by eliminating an unnecessary rotation, the attenuation filters 49 and 50 must be rotated in directions closer to target attenuation amounts from current positions, and the forward and reverse rotational directions of the attenuation filters 49 and 50 are controlled in accordance with the target attenuation amounts. Accordingly, even if the target attenuation amounts are the same, the actual attenuation amounts are different depending on the rotational directions of the attenuation filters, and desired attenuation amounts cannot be constantly obtained by the same value.

In each attenuator, when the attenuation amount is to be greatly varied, a plurality of infinite attenuation amounts or level variations are caused.

The problem of the variation in attenuation amount is that it adversely affects a system using an optical attenuator and, in particular, an error rate measuring system 150 including an optical repeater 51 shown in FIG. 34.

When the attenuation amount varies in an optical attenuator 52 during error rate measurement using the optical repeater 51, the light-receiving level of the measuring system varies instantaneously. This variation cannot be detected as an abnormal value or regarded as an error. In the worst case, measurement is disabled.

When the light-receiving level varies, as described above, a protection function is started to prevent the optical repeater 51 from being damaged by a spike current, and the measuring system is sometimes stopped.

Conventionally, in order to avoid malfunction of the protection function, a control program for estimating a level variation and its influence is separately prepared in advance as a control function of the entire system.

SUMMARY OF THE INVENTION

It is, therefore, an object of the present invention to provide a new and improved optical attenuator apparatus in which an instantaneous change in attenuation amount is decreased by removing an influence of backlash so that a level variation does not occur when the attenuation amount is to be changed, thereby obtaining a substantially smooth attenuation characteristic.

According to the present invention, there is provided an optical attenuator apparatus comprising:

incident means for guiding light to be attenuated to a predetermined optical path;

first optical attenuation filter means, arranged in the predetermined optical path, for attenuating the light to be attenuated incident through the incident means by a first variable attenuation amount, the first optical attenuation filter means being capable of being driven in forward and reverse directions and having an attenuation characteristic which changes monotonously in both the forward and reverse directions;

second optical attenuation filter means, arranged in the predetermined optical path, for attenuating, by a second variable attenuation amount, the light which has been transmitted through the first optical attenuation filter means using the first variable attenuation amount, the second optical attenuation filter means being capable of being driven in the forward and reverse directions and having an attenuation amount characteristic which changes monotonously in both the forward and reverse directions;

optical output means, arranged in the predetermined optical path, for causing light which has been transmitted through the first and second optical attenuation filter means to emerge under a condition using an algebraic su of the first and second variable attenuation amounts;

attenuation amount setting means for setting a desired attenuation amount by which the light to be attenuated which is incident through the incident means is attenuated;

first drive means coupled to drive the first optical attenuation filter means in the forward and reverse directions;

second drive means coupled to drive the second optical attenuation filter means in the forward and reverse directions; and control means for controlling driving directions and driving amounts of the first and second optical attenuation filter means through the first and second drive means in accordance with the desired attenuation amount set by the attenuation amount setting means so that the algebraic sum of the first and second attenuation amounts finally becomes equal to the desired attenuation amount and a variation in attenuation amount is decreased as a whole, thereby providing a smooth attenuation characteristic.

In the arrangement described above, the attenuation amounts of the first and second optical attenuation filters are shared such that their sum becomes a desired attenuation amount. The attenuation amounts of the first and second optical attenuation filters are set in opposite directions. In this case, the attenuation amount of the first optical attenuation filter is set in a decreasing direction, and that of the second optical attenuation filter is set in an increasing direction. When the attenuation amounts of the first and second optical attenuation filter means are to be changed, they are changed from initial attenuation amounts before change to corresponding target attenuation amounts after change. That is, in the process (final access process) of changing the attenuation amount of the first optical attenuation filter means to an amount immediately before the corresponding constant target attenuation amount, the amount is changed from an amount larger than the target attenuation amount to reach the target attenuation amount. Similarly, in the final access process of the second optical attenuation filter means, the attenuation amount is changed from an amount smaller than the corresponding target attenuation amount to reach the target attenuation amount. The transient change amounts of the two optical attenuation filters from their initial amounts until their final access processes may be set such that their algebraic sum changes monotonously (including invariant flat portions in the change processes).

In the arrangement described above, to change an attenuation amount to a desired attenuation amount, the first attenuation filter unit is driven in one direction (e.g., in a direction to increase the attenuation amount) to pass a preset position and thereafter in an opposite direction to return it to the preset position. Along with this operation, the second attenuation filter unit is driven in the same direction as that of the first attenuation filter unit to immediately before a preset position and thereafter in the same direction to the preset position. The desired attenuation amount can be obtained by the sum of the attenuation amounts of the two attenuation filter units. A variation in attenuation amount is decreased in the process of changing the attenuation amount, thereby obtaining a substantially smooth attenuation characteristic.

To completely remove the influence of the backlash and the variation in attenuation amount to constantly obtain a smooth attenuation characteristic, it is preferable that movements of the first and second attenuation filter units are controlled so as not exceed the desired attenuation amount when the attenuation amount is to be increased and so as not to be decreased below the desired attenuation amount when the attenuation amount is to be decreased, thereby controlling to synchronize the final movements in the opposite directions.

According to another aspect of the present invention, there is provided an optical attenuator apparatus in which an optical attenuation amount thereof is changed such that a plurality of optical attenuation filters for transmitting light therethrough are moved relative to or independently of each other, comprising:

a continuous variable attenuation filter in which attenuation filters whose attenuation amounts change continuously are used as the optical attenuation filters;

a step variable attenuation filter in which attenuation filters whose attenuation amounts change continuously are employed to use only stepwise attenuation amount portions of the attenuation filters; and control means for performing control to obtain a preset predetermined attenuation amount by a combination of the continuous variable attenuation filter and the step variable attenuation filter, and controlling relative rotational speeds of the continuous variable attenuation filter and the step variable attenuation filter by a ratio of attenuation amount distributions of the continuous variable attenuation filter and the step variable attenuation filter and a ratio of transfer attenuation change amounts thereof at transfer points, thereby changing an step variable attenuation filter.

In the arrangement described above, an optical attenuator having a large attenuation amount can be obtained by combining the continuous variable attenuation filter and the step variable attenuation filter.

The step variable attenuation filter operates in a stepwise manner when the attenuation amount is equal to or larger than (or equal to or smaller than) a value allowed by the continuous variable attenuation filter. This stepwise operation point is called a transfer point.

The step variable attenuation filter has a continuous attenuation amount. The control means calculates a relative rotational speed from a reciprocal ratio of the ratio of attenuation amount distributions of the continuous variable attenuation filter and the step variable attenuation filter and a reciprocal ratio of a ratio of change amounts in transfer attenuation, and drives the drive shafts. As a result, the attenuation amount at the transfer point portion can be smoothly changed without a level variation.

Additional objects and advantages of the invention will be set forth in the description which follows, and will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 4A, 4B, and 4C are graphs showing the operations of the continuous attenuation filters when the attenuation amount is decreased by the filters shown in FIG. 2;

FIGS. 8A, 8B, and 8C are graphs showing the operations of continuous attenuation filters of an optical attenuator according to the third embodiment of the present invention when the attenuation amount is to be increased by removing an amount exceeding a desired attenuation amount;

FIG. 10 shows a rotational arrangement of continuous attenuation filters of an optical attenuator according to the fourth embodiment of the present invention;

FIG. 13 shows an arrangement of continuous attenuation filters of an optical attenuator according to the sixth embodiment of the present invention;

FIG. 15 is a view for explaining the principle of the optical attenuator according to the present invention and shows an arrangement of continuous attenuation filters used in the seventh embodiment of the present invention;

FIGS. 16A, 16B, and 16C are graphs for explaining the principle of the optical attenuator according to the present invention and show the operations of the optical attenuator when the attenuation amount is to be increased by using the continuous attenuation filters of FIG. 15;

FIGS. 21A, 21B, and 21C are graphs respectively showing a change in attenuation amount of the variable attenuation filter of FIG. 20 after a transfer point as a function of time;

FIGS. 22A and 22B are tables respectively showing transfer points and changes in attenuation amount of the optical attenuator of FIG. 17 at the transfer points;

FIG. 23 is a perspective view of a variable attenuation filter according to the ninth embodiment of the present invention;

FIG. 24 is a perspective view of a variable attenuation filter according to the tenth embodiment of the present invention;

FIGS. 27A, 27B, and 27C are graphs showing an output characteristic at a preset attenuation amount obtained by the optical attenuator according to the present invention and the conventional optical attenuator;

FIG. 28 shows a general schematic arrangement of an optical attenuator used in optical communication;

FIG. 34 is a block diagram of an error rate measuring system having an optical repeater and using an optical attenuator.

DETAILED DESCRIPTION OF THE PREFERRED EMBODIMENTS

Figure 1:
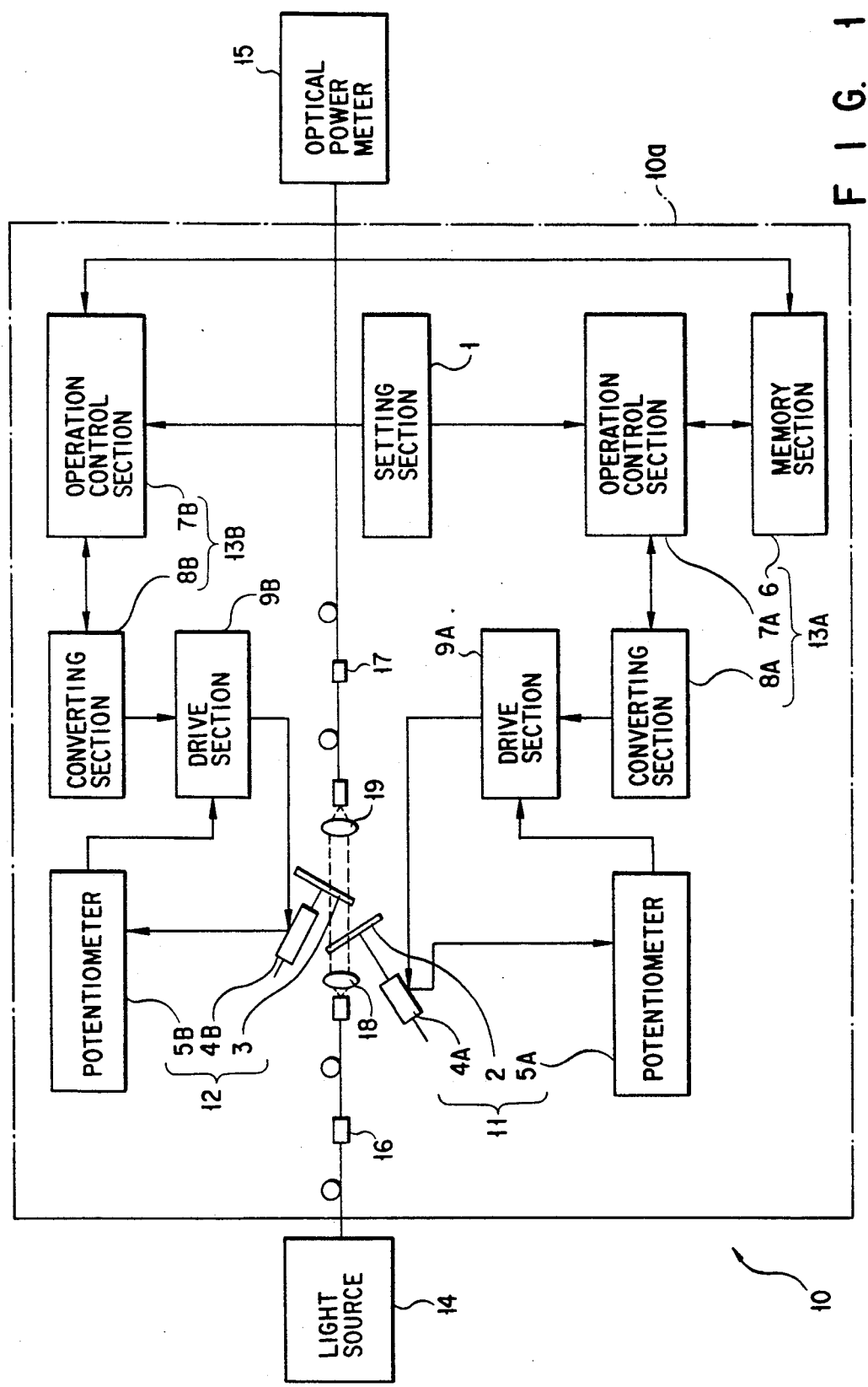
FIG. 1 is a block diagram showing a schematic arrangement of an optical attenuator according to the first embodiment of the present invention.

Reference will now be made in detail to the presently preferred embodiments of the invention as illustrated in the accompanying drawings, in which like reference characters designate like or corresponding parts throughout the several drawings.

Figure 2:
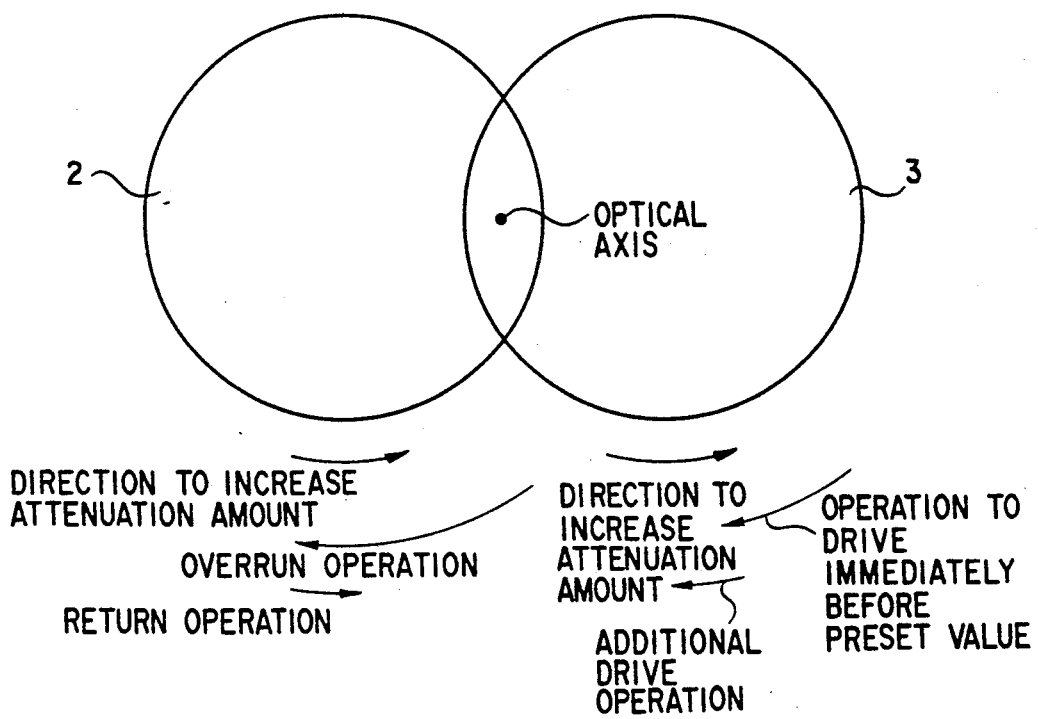
FIG. 2 shows a rotational arrangement of continuous attenuation filters used in the optical attenuator of FIG. 1.

FIG. 1 is a block diagram showing a schematic arrangement of an optical attenuator according to the first embodiment of the present invention, FIG. 2 shows a rotational arrangement of continuous attenuation filters used in the optical attenuator of FIG. 1, FIGS. 3A, 3B, and 3C are graphs showing the operations of the continuous attenuation filters when the attenuation amount is increased by the filters shown in FIG. 2, and FIGS. 4A, 4B, and 4C are graphs showing the operations of the continuous attenuation filters when the attenuation amount is decreased by the filters shown in FIG. 2.

An optical attenuator 10 according to the first embodiment has, in an attenuator body 10a thereof, a setting section 1, first and second continuous attenuation filters 2 and 3, potentiometers 5A and 5B, a memory section 6, operation control sections 7A and 7B, converting sections 8A and 8B, and drive sections (drive units) 9A and 9B. The setting section 1 sets an attenuation amount to a desired value. The potentiometers 5A and 5B detect rotational angles of motors 4A and 4B to which the continuous attenuation filters 2 and 3, respectively, are mounted. The memory section 6 stores attenuation amount data of the continuous attenuation filters 2 and 3 at two reference wavelengths $\lambda 1$ and $\lambda 2$. The operation control sections 7A and 7B such as CPUs read out the corresponding attenuation amount data from the memory section 6 on the basis of a preset value set by the setting section 1, output control signals for designating rotational angles in both forward and reverse directions of the continuous attenuation filters 2 and 3, and calculate wait time required for driving the motors 4A and 4B. The converting sections 8A and 8B such as D/A converters convert the control signals (digital data) from the operation control sections 7A and 7B to analog signals. The drive sections 9A and 9B drive the motors 4A and 4B in predetermined directions on the basis of the signals from the converting sections 8A and 8B.

The continuous attenuation filter 2 (3), the motors 4A and 4B, and the potentiometers 5A and 5B constitute first and second continuous attenuation filter units 11 and 12. The memory section 6, the operation control sections 7A and 7B, and the converting sections 8A and 8B constitute control units 13A and 13B.

Incident- and exit-side connectors 16 and 17 are arranged on two sides of the attenuator body 10a in order to attenuate light incident from a light source 14 by a predetermined amount and to output the attenuated light to, e.g., an optical power meter 15. Two sets of lenses 18 and 19 for collimating light supplied from the light source 14 and the incident-side conductor 16 and guiding the parallel beam to the exit-side connector 17 are arranged on an optical path connecting the connectors 16 and 17. The two continuous attenuation filters 2 and 3 are arranged in an optical path between the lenses 18 and 19.

In each of the continuous attenuation filters 2 and 3, a metal film whose transmittance changes continuously in a circumferential direction is formed on a glass disc so that an attenuation amount changes monotonously in the rotational direction. That is, in the first embodiment, a metal film is formed in each of the continuous attenuation filters 2 and 3 such that the attenuation amount is increased in a counterclockwise direction of the circumference. The continuous attenuation filters 2 and 3 are arranged to partially overlap each other in an optical path along which light is transmitted. The main shafts of the continuous attenuation filters 2 and 3 are coupled to the main shafts of the motors 4A and 4B. The continuous attenuation filters 2 and 3 are controlled independently of each other by the motors 4A and 4B on the basis of the control signals supplied from the operation control sections 7A and 7B.

The operation of the optical attenuator having the above arrangement will be described by way of a case in which the attenuation amount is changed from 20 to 22 dB.

Assume that the attenuation amount data corresponding to an attenuation amount of 20 dB at a preset wavelength X of the respective continuous attenuation filters 2 and 3 are A0 and B0.

When the attenuation amount is set at 22 dB by the setting section 1, the operation control sections 7A and 7B read data A1, A2, B1, and B2 corresponding to 22 dB of the continuous attenuation filters 2 and 3 at the two reference wavelengths $\lambda 1$ and $\lambda 2$ from the memory section 6. The data A1, A2, B1, and B2 are written in the memory section 6 in advance in units of continuous attenuation filters 2 and 3.

The read data A1, A2, B1, and B2 are subjected to correction calculation by using the two reference wavelengths λ1 and λ2 with respect to the preset wavelength X by the operation control sections 7A and 7B in accordance with the following equation, thereby obtaining attenuation amounts of the continuous attenuation filters 2 and 3:

$$A = A1 - \{A1 - A2\}\frac{x - \lambda 1}{\lambda 1 - \lambda 1},$$

$$B = B1 - \{B1 - B2\}\frac{x - \lambda 1}{\lambda 2 - \lambda 1}$$

Subsequently, the operation control sections 7A and 7B calculate data A' and B' of corrected attenuation amounts obtained by adding an overrun amount V to the calculated attenuation amounts, and a wait time $S = |D(A0-A') + E|$ or $S = |D(B0-B') + E|$, which is necessary for driving the motors 4A and 4B, where D and E are constants.

The data A1 and B1 of the attenuation amounts from which the overrun amounts are removed are written in the converting sections 8A and 8B by the operation control sections 7A and 7B. The converting sections 8A and 8B activate the drive sections 9A and 9B based on the stored data A1 and B1. The drive sections 9A and 9B drive the motors 4A and 4B to rotate the continuous attenuation filters 2 and 3 to reach predetermined positions where the wait time S becomes 0.

The operations of the continuous attenuation filters subjected to rotational control will be described. To increase the attenuation amount from 20 to 22 dB by the continuous attenuation filters 2 and 3, between time ta and time tc of FIG. 3A, the first continuous attenuation filter 2 (the filter on the left side in FIG. 2) is controlled to overrun in a direction (counterclockwise direction) to increase the attenuation amount from a desired rotational angle (corresponding to an attenuation amount of 11 dB) by a predetermined rotational angle until the attenuation amount is 11.2 dB. Then, between time tc and time td, the continuous attenuation filter 2 is controlled to return in a direction to decrease the attenuation amount by a desired rotational angle, thereby obtaining an attenuation amount of 11 dB. Along with this operation, between time ta and time tb of FIG. 3B, the second continuous attenuation filter 3 (the filter on the right side of FIG. 2) is rotated in a direction (counterclockwise direction) to increase the attenuation amount to reach immediately before a desired rotational angle (corresponding to an attenuation amount of 11 dB), thereby obtaining an attenuation amount of 10.8 dB. Thereafter, between time tb and time tc, the second continuous attenuation filter 3 is stopped to keep the attenuation amount of 10.8 dB. Then, between time tc and time td of FIG. 3B, the second filter 3 is rotated, in synchronism with the return operation of the first continuous attenuation filter 2, in a direction to decrease the attenuation amount by the same returning angle as the filter 2 to reach a desired rotational angle, thereby obtaining an attenuation amount of 11 dB.

Figure 3A:
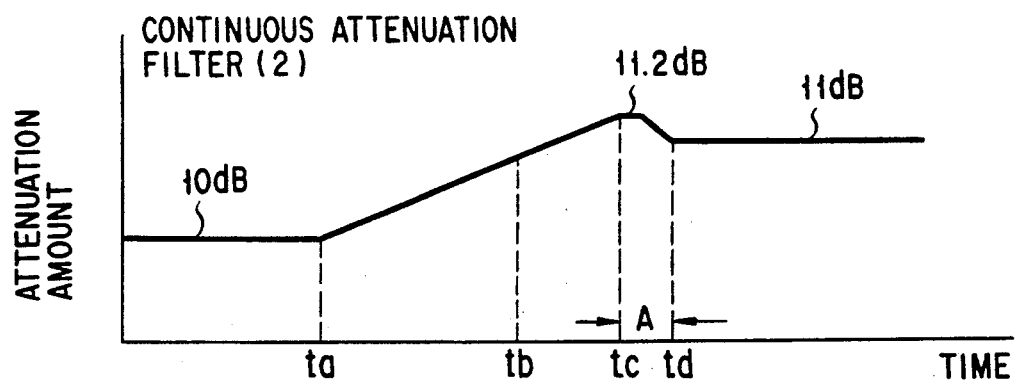
FIGS. 3A, 3B, and 3C are graphs showing the operations of the continuous attenuation filters when the attenuation amount is increased by the filters shown in FIG. 2.
Figure 3B:
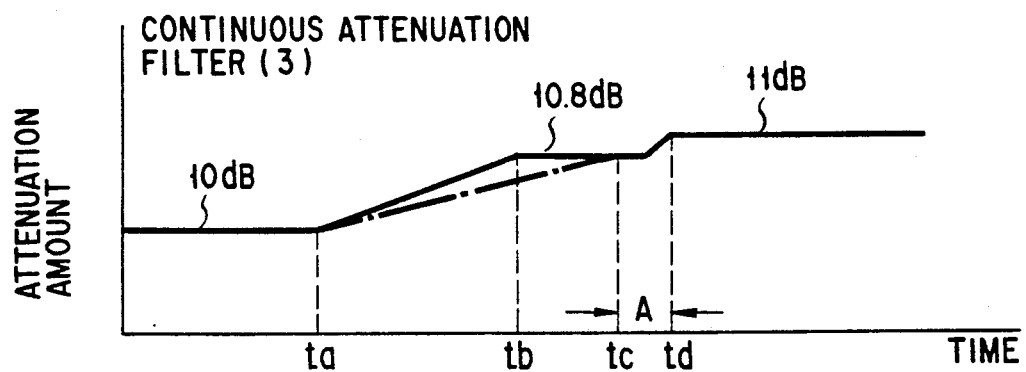
Figure 3C:
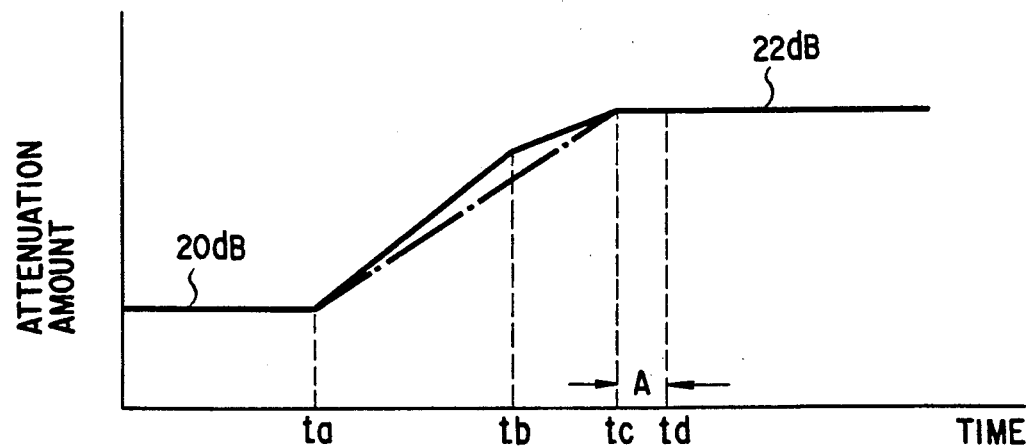

In this manner, the attenuation amount is increased to 22 dB by the synthesis of both continuous attenuation filters 2 and 3, as shown in FIG. 3C. As a result, light incident from the light source 14 through the incident-side connector 16 is attenuated to a desired attenuation amount by the continuous attenuation filters 2 and 3 and emerges to the exit-side connector 17. At this time, by the rotating operations of the continuous attenuation filters 2 and 3 in opposite directions in a period A of FIGS. 3A to 3C, in a process of changing the attenuation amount, the attenuation amount does not vary instantaneously to remove the influence of the backlash, thereby obtaining a constantly smooth attenuation characteristic.

Since the continuous attenuation filters 2 and 3 are constituted by rotary discs, a space required for the movement of the filters 2 and 3 can be minimized.

To decrease the attenuation amount from 22 to 20 dB by the continuous attenuation filters 2 and 3 as shown in FIG. 4C, between time ta and time tc of FIG. 4B, the second continuous attenuation filter 3 (the filter on the right side in FIG. 2) is controlled to overrun in a direction (clockwise direction) to decrease the attenuation amount from a desired rotational angle (corresponding to an attenuation amount of 10 dB) by a predetermined rotational angle until the attenuation amount is 9.8 dB. Then, between time tc and time td in FIG. 4B, the continuous attenuation filter 2 is controlled to return in a direction to increase the attenuation amount by a desired rotational angle, thereby obtaining an attenuation amount of 10 dB. Along with this operation, between time ta and time tb of FIG. 4A, the first continuous attenuation filter 2 (the filter on the left side of FIG. 2) is rotated in a direction (clockwise direction) to decrease the attenuation amount to reach immediately before a desired rotational angle (corresponding to an attenuation amount of 10 dB), thereby obtaining an attenuation amount of 10.2 dB. Thereafter, between time tb and time tc of FIG. 4A, the first continuous attenuation filter 2 is stopped to keep the attenuation amount of 10.2 dB. Then, between time tc and time td of FIG. 4A, the filter 2 is rotated, in synchronism with the return operation of the second continuous attenuation filter 3, in a direction to increase the attenuation amount by the same returning angle as the filter 3 to reach a desired rotational angle, thereby obtaining an attenuation amount of 10 dB.

In the operation described above, the continuous attenuation filters 2 and 3 are controlled at the same speed. Therefore, one of the filters which does not overrun (corresponding to, e.g., the filter 3 when the attenuation amount is to be increased) is stopped at a position of a predetermined attenuation amount while the other filter overruns (corresponding to the time tc). However, the wait time generated by the stop may be eliminated, as indicated by an alternate long and short dashed line in FIGS. 3B and 3C, and the filter which does not overrun may be controlled to rotate.

Figure 5:
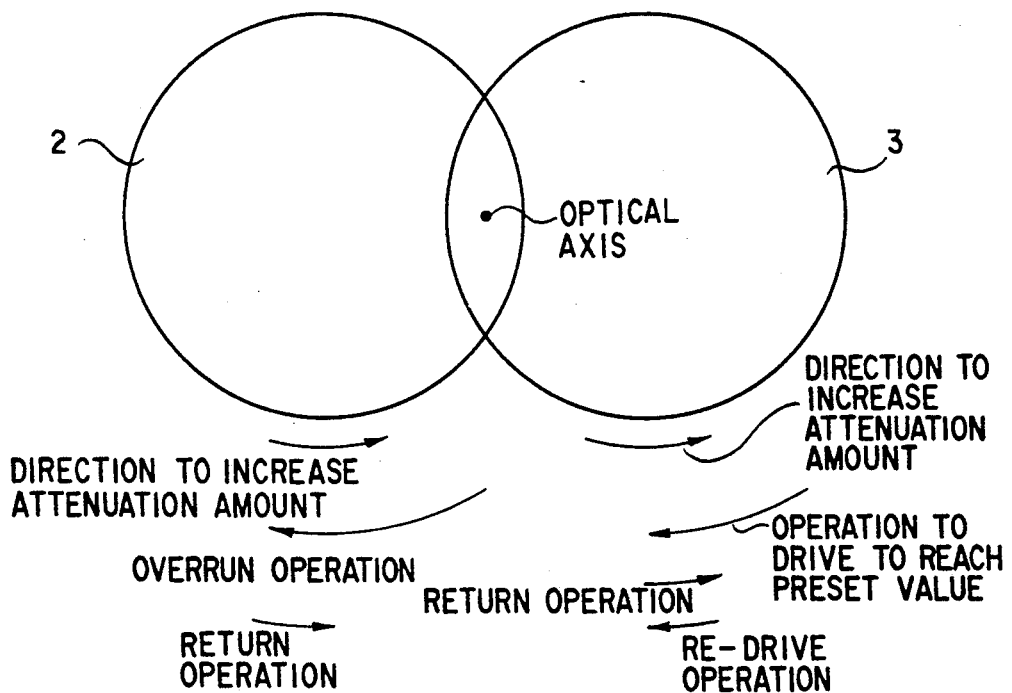
FIG. 5 shows a rotational arrangement of continuous attenuation filters used in an optical attenuator according to the second embodiment of the present invention.
Figure 6A:
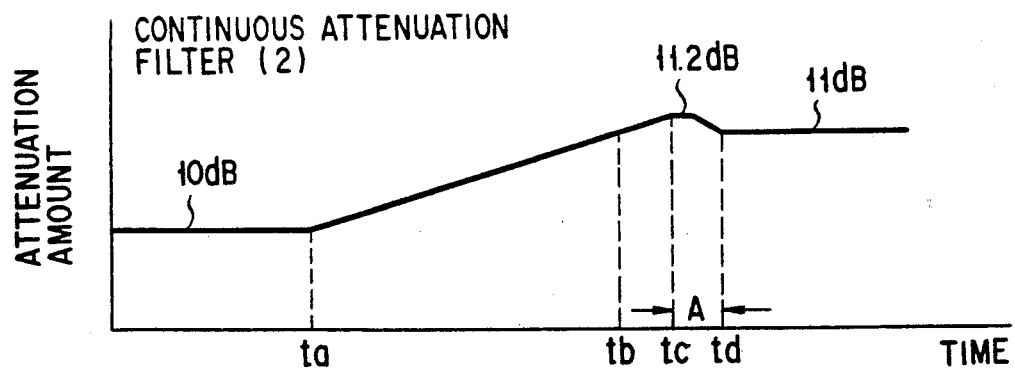
FIGS. 6A, 6B, and 6C are graphs showing the operations of the continuous attenuation filters when the attenuation amount is increased by the filters shown in FIG. 5.
Figure 6B:
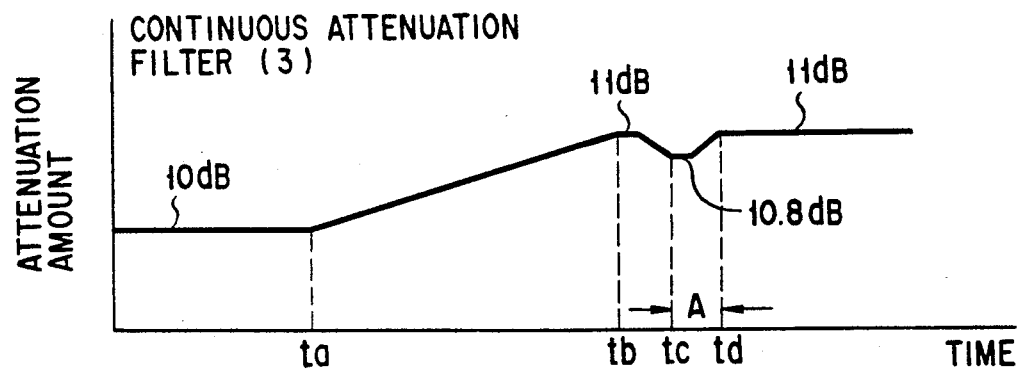
Figure 6C:
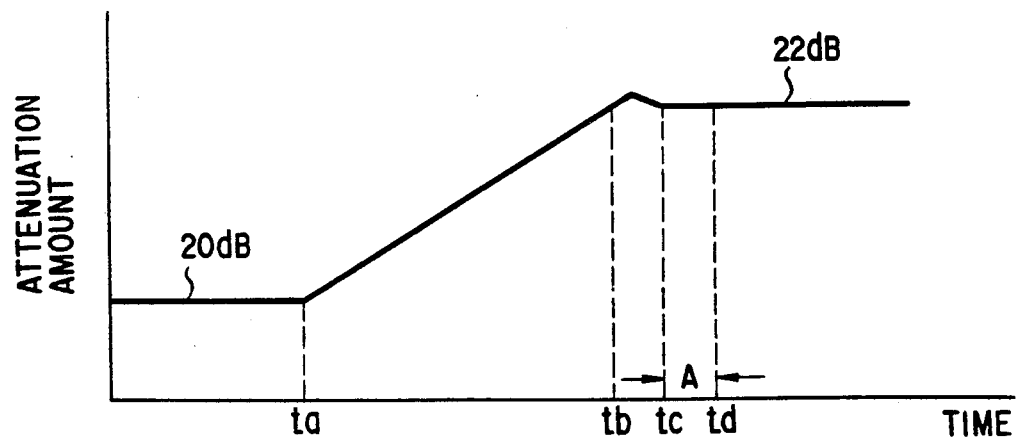

FIG. 5 shows a rotational arrangement of continuous attenuation filters used in an optical attenuator according to the second embodiment of the present invention, FIGS. 6A, 6B, and 6C are graphs showing the operations of the continuous attenuation filters when the attenuation amount is increased by the filters shown in FIG. 5, and FIGS. 7A, 7B, and 7C are graphs showing the operations of the continuous attenuation filters when the attenuation amount is decreased by the filters shown in FIG. 5.

In the optical attenuator of the second embodiment, although the operation of continuous attenuation filters 2 and 3 is different from that of the first embodiment, the arrangement of the filters 2 and 3 and other components is the same as that in the first embodiment.

More specifically, to increase the attenuation amount from 20 to 22 dB by the continuous attenuation filters 2 and 3, between time ta and time tc of FIG. 6A, a first continuous attenuation filter 2 (the filter on the left side in FIG. 5) is controlled to overrun in a direction (counterclockwise direction) to increase the attenuation amount from a desired rotational angle (corresponding to an attenuation amount of 11 dB) by a predetermined rotational angle until the attenuation amount is 11.2 dB. Then, between time tc and time td of FIG. 6A, the continuous attenuation filter 2 is controlled to return in a direction to decrease the attenuation amount by a desired rotational angle, thereby obtaining an attenuation amount of 11 dB. Along with this operation, between time ta and time tb of FIG. 6B, the second continuous attenuation filter 3 (the filter on the right side of FIG. 5) is rotated in a direction (counterclockwise direction) to increase the attenuation amount to a desired rotational angle (corresponding to an attenuation amount of 11 dB), thereby obtaining an attenuation amount of 11 dB. Thereafter, between time tb and time tc of FIG. 6B, the second continuous attenuation filter 3 is returned in a direction (clockwise direction) to decrease the attenuation amount by a predetermined rotational angle, thus obtaining an attenuation amount of 10.8 dB. Then, between time tc and time td of FIG. 6B, the second filter 3 is rotated, in synchronism with the return operation of the first continuous attenuation filter 2, in a direction to increase the attenuation amount by the same returning angle as the filter 2 to reach a desired rotational angle, thereby obtaining an attenuation amount of 11 dB. As a result, the attenuation amount is increased to 22 dB by the synthesis of the both continuous attenuation filters 2 and 3, as shown in FIG. 6C. At this time, the influence of the backlash is removed by the rotating operations of the continuous attenuation filters 2 and 3 in opposite directions in a period A of FIGS. 6A to 6C.

Figure 7A:
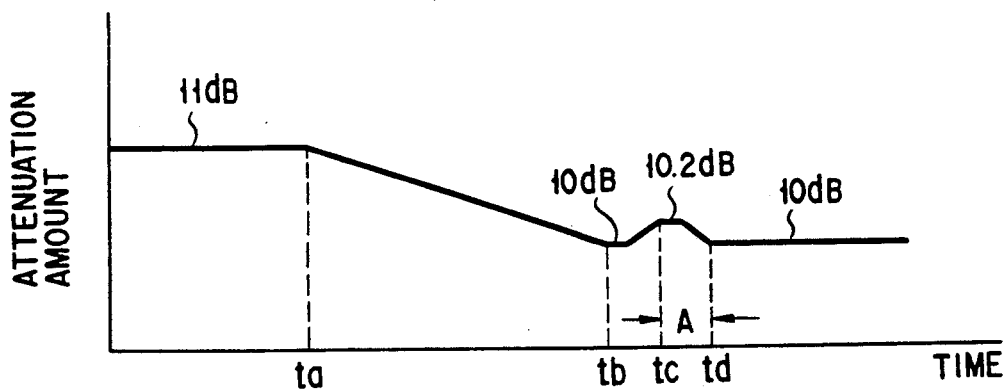
FIGS. 7A, 7B, and 7C are graphs showing the operations of the continuous attenuation filters when the attenuation amount is decreased by the filters shown in FIG. 5.
Figure 7B:
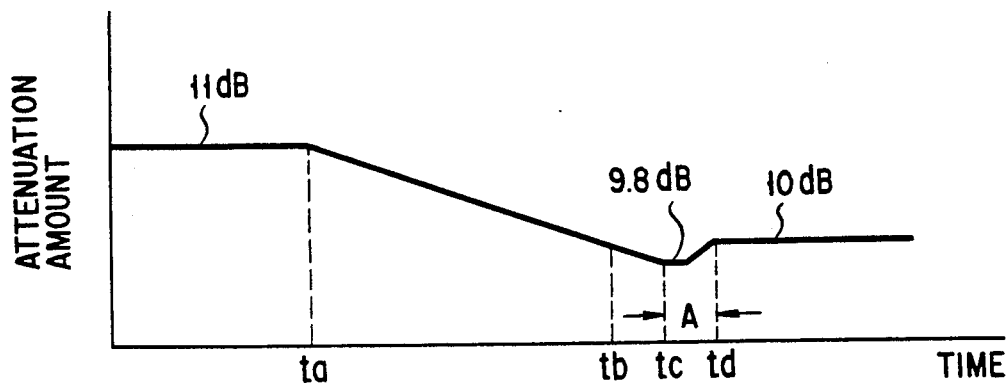
Figure 7C:
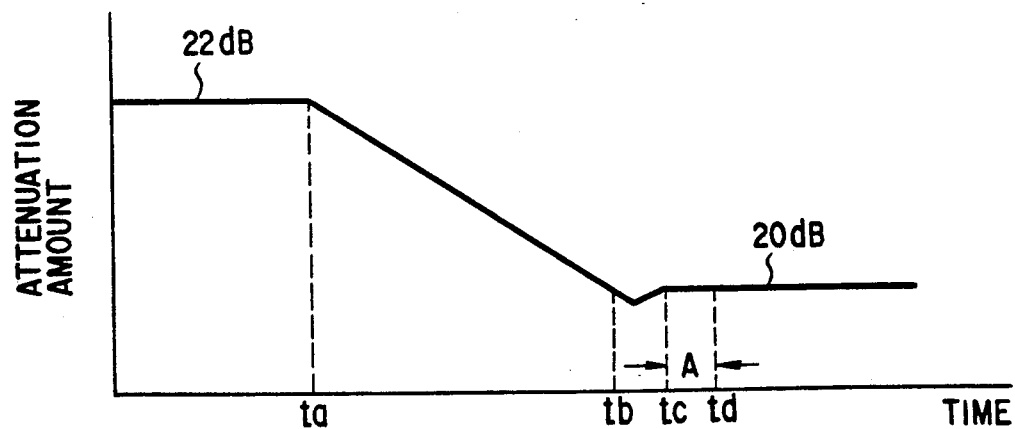
Figure 9A:
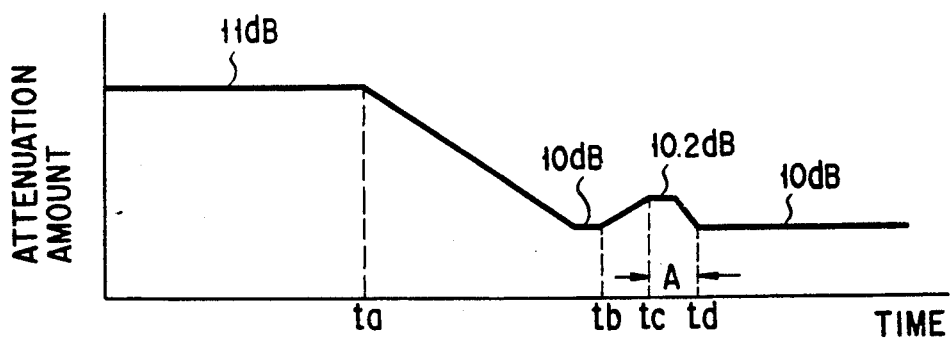
FIGS. 9A, 9B, and 9C are graphs showing the operations of continuous attenuation filters of the optical attenuator according to the third embodiment of the present invention when the attenuation amount is to be decreased by removing an amount exceeding a desired attenuation amount.
Figure 9B:
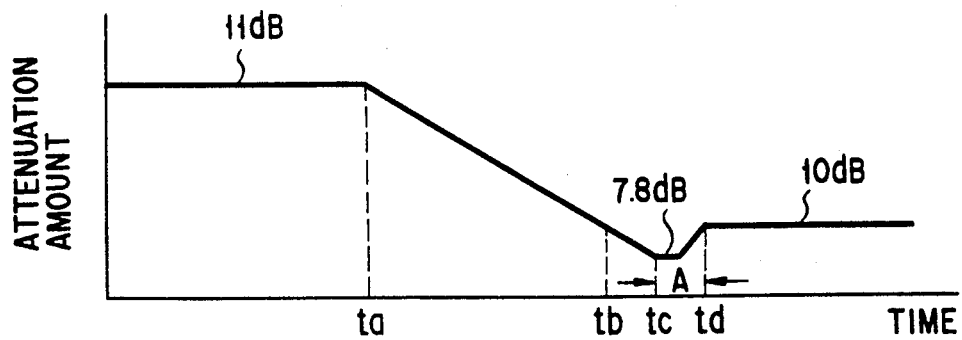
Figure 9C:
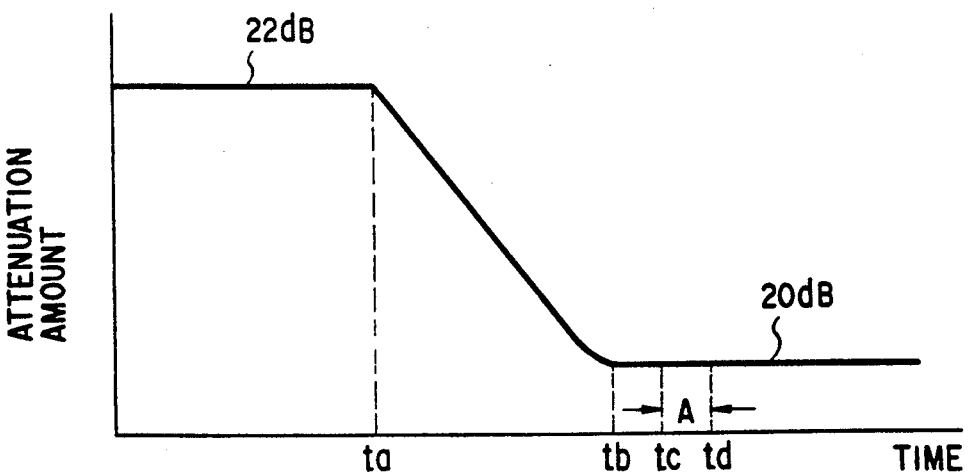

To decrease the attenuation amount from 22 to 20 dB by the continuous attenuation filters 2 and 3 as shown in FIG. 7C, between time ta and time tc of FIG. 7B, the second continuous attenuation filter 3 (the filter on the right side in FIG. 5) is controlled to overrun in a direction (clockwise direction) to decrease the attenuation amount from a desired rotational angle (corresponding to an attenuation amount of 10 dB) by a predetermined rotational angle until the attenuation amount is 9.8 dB. Then, between time tc and time td in FIG. 7B, the continuous attenuation filter 2 is controlled to return in a direction to increase the attenuation amount by a desired rotational angle, thereby obtaining an attenuation amount of 10 dB. Along with this operation, between time ta and time tb of FIG. 7A, the first continuous attenuation filter 2 (the filter on the left side of FIG. 5) is rotated in a direction (clockwise direction) to decrease the attenuation amount to reach a desired rotational angle (corresponding to an attenuation amount of 10 dB), thereby obtaining an attenuation amount of 10 dB. Thereafter, between time tb and time tc of FIG. 7A, the first continuous attenuation filter 2 is returned in a direction (clockwise direction) to increase the attenuation amount by a predetermined rotational angle, thereby obtaining an attenuation amount of 10.2 dB. Then, between time tc and time td of FIG. 7A, the filter 2 is rotated, in synchronism with the return operation of the second continuous attenuation filter 3, in a direction to increase the attenuation amount by the same returning angle as the filter 3 to reach a desired rotational angle, thereby obtaining an attenuation amount of 10 dB.

In the operation described above, during the process of obtaining a desired attenuation amount, the attenuation amount partially slightly exceeds the desired attenuation amount. However, the excessive amount is very small and does not directly influence the attenuation characteristic.

FIGS. 8A, 8B, and 8C and FIGS. 9A, 9B, and 9C are graphs for showing the operations of continuous attenuation filters of an optical attenuator according to the third embodiment of the present invention when the attenuation amount is to be increased and decreased, respectively, by removing an amount exceeding a desired attenuation amount.

More specifically, in the third embodiment, to increase the attenuation amount, before time tb in FIG. 8A, when a first continuous attenuation filter 2 which overruns has an attenuation amount exceeding an attenuation amount of 11 dB, a second continuous attenuation filter 3 is rotated to reach an angle where the attenuation amount is 11 dB. Similarly, to decrease the attenuation amount, before time tb in FIG. 9A, when the second continuous attenuation filter 3 has an attenuation amount lower than an attenuation amount of 10 dB, the first continuous attenuation filter 2 is rotated to reach an angle where the attenuation amount is 10 dB.

In this manner, in a process of changing the attenuation amount to a desired value, the attenuation amount can be changed without exceeding a desired value while the influence of backlash is removed by the rotating operations of the continuous attenuation filters 2 and 3 in opposite directions in a period A of FIGS. 8A to 8C and FIGS. 9A to 9C.

Figure 11A:
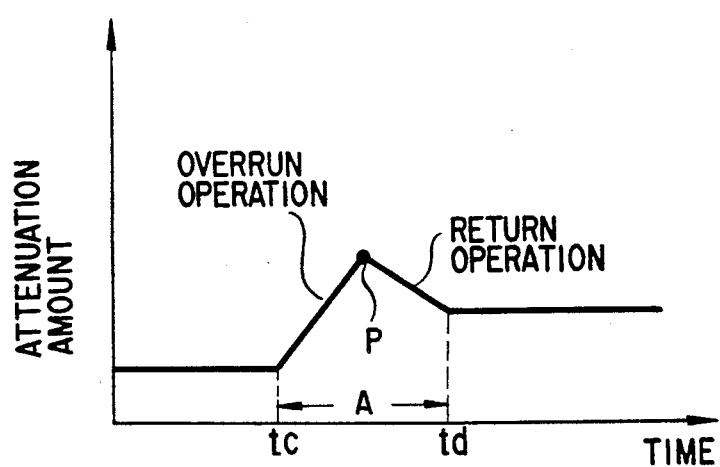
FIGS. 11A, 11B, and 11C are graphs showing the operations of the continuous attenuation filters when the attenuation amount is changed by the filters shown in FIG. 10.
Figure 11B:
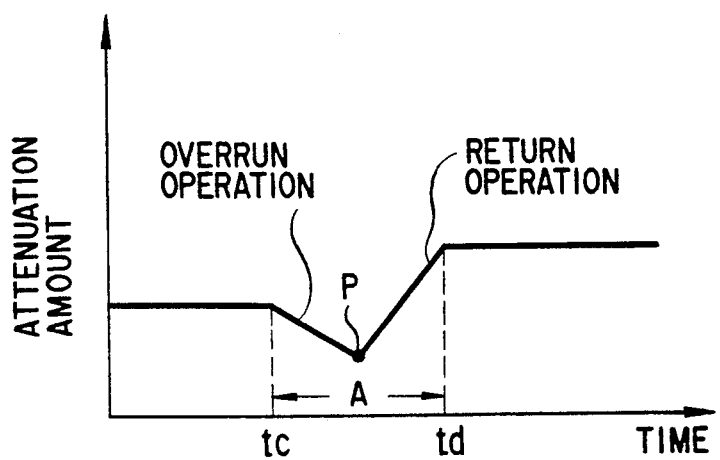
Figure 11C:
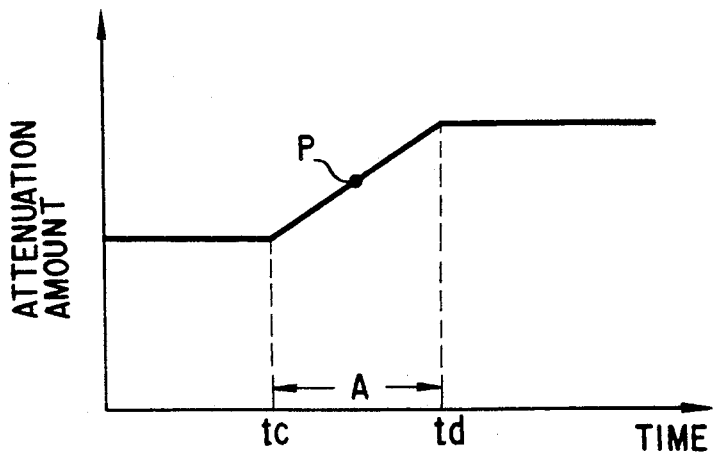

FIG. 10 shows a rotational arrangement of continuous attenuation filters of an optical attenuator according to the fourth embodiment of the present invention, and FIGS. 11A, 11B, and 11C are graphs showing the operations of the continuous attentuation filters when the attenuation amount is changed by the filters shown in FIG. 10.

In the optical attenuator of the fourth embodiment, although the operation of continuous attenuation filters 2 and 3 is different from that of the first embodiment, the arrangement of the filters 2 and 3 and other components is the same as that in the first embodiment.

In the fourth embodiment, to change the attenuation amount, during a period A (between time tc and time td) of FIGS. 11A to 11C, the first continuous attenuation filter 2 is controlled to overrun in a direction (counterclockwise direction) to increase the attenuation amount from a rotational angle corresponding to a desired attenuation amount by a predetermined rotational angle, and is then returned in a direction to decrease the attenuation amount. The filter 2 is rotated by a desired rotational angle in this manner. Along with this operation, the second continuous attenuation filter 3 is controlled to rotate in a direction (clockwise direction) to decrease the attenuation amount from a rotational angle corresponding to a desired attenuation amount by a predetermined rotational angle, that is, to rotate in an opposite direction to that of the first continuous attenuation filter 2 and thus to overrun, and is returned in a direction to increase the attenuation amount. The filter 3 is rotated by a desired rotational angle in this manner.

More specifically, to decrease the attenuation amount, in the period A, the motors 4A and 4B drive to rotate the continuous attenuation filters 2 and 3 such that the attenuation amounts change in opposite directions, thus rotating the filters 2 and 3 to positions to obtain a desired attenuation amount. This embodiment is practiced when a desired set attenuation amount falls within a range of an overrun operation.

Therefore, in the fourth embodiment, similar to the first and second embodiments, in the process of changing the attenuation amount by rotating the continuous attenuation filters 2 and 3 in opposite directions in the period A, the attenuation amount does not change instantaneously and the influence of the backlash is thus eliminated, thereby constantly obtaining a smooth attenuation characteristic.

The fourth embodiment exemplifies a case in which the first and second continuous attenuation filters 2 and 3 are controlled to increase and decrease, respectively, the attenuation amount. The same effect can be obtained even if the rotational directions of the first and second continuous attenuation filters 2 and 3 are reversed.

Figure 12:
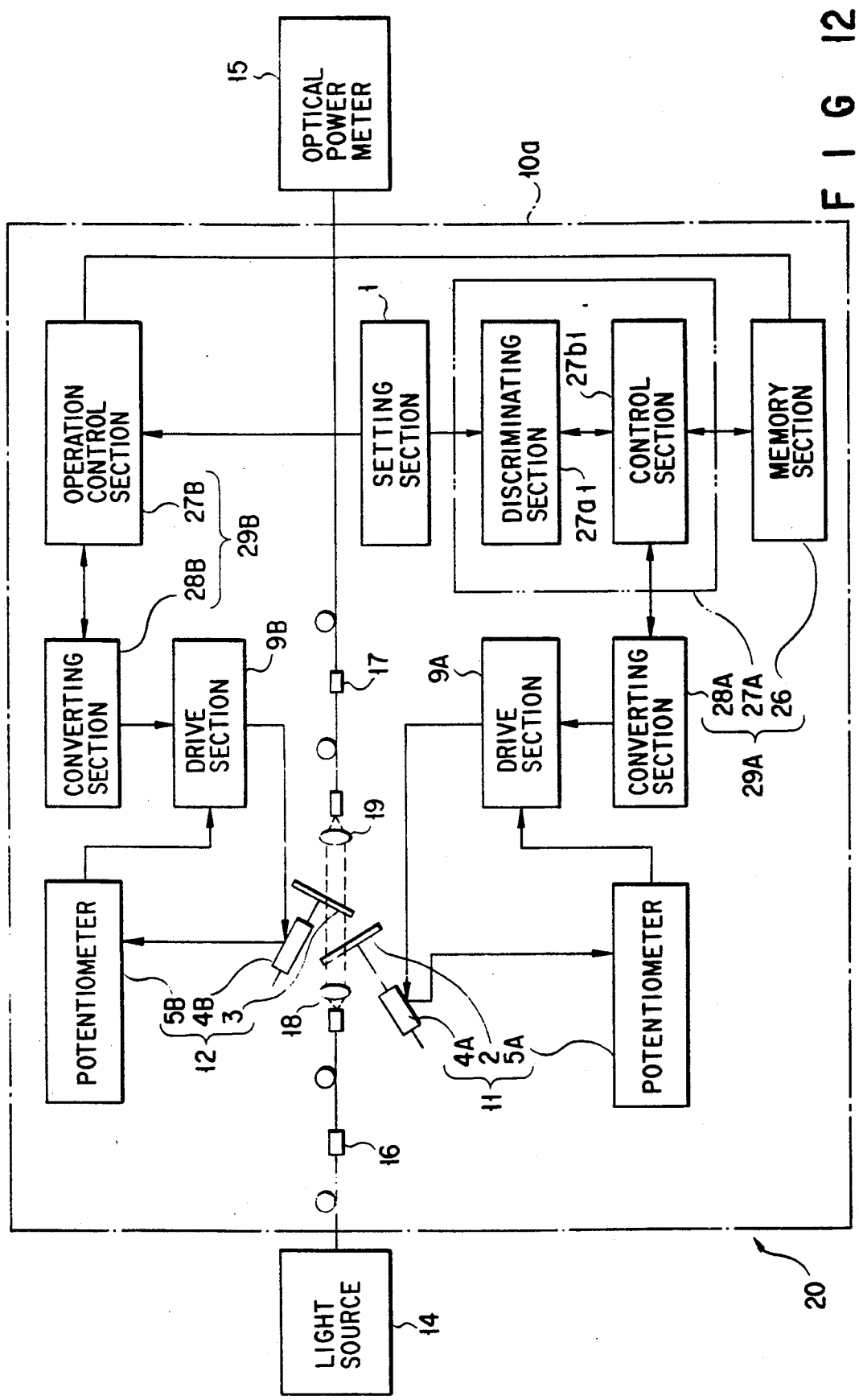
FIG. 12 is a block diagram of an optical attenuator according to the fifth embodiment of the present invention.

FIG. 12 is a block diagram of an optical attenuator according to the fifth embodiment of the present invention.

Figure 33:
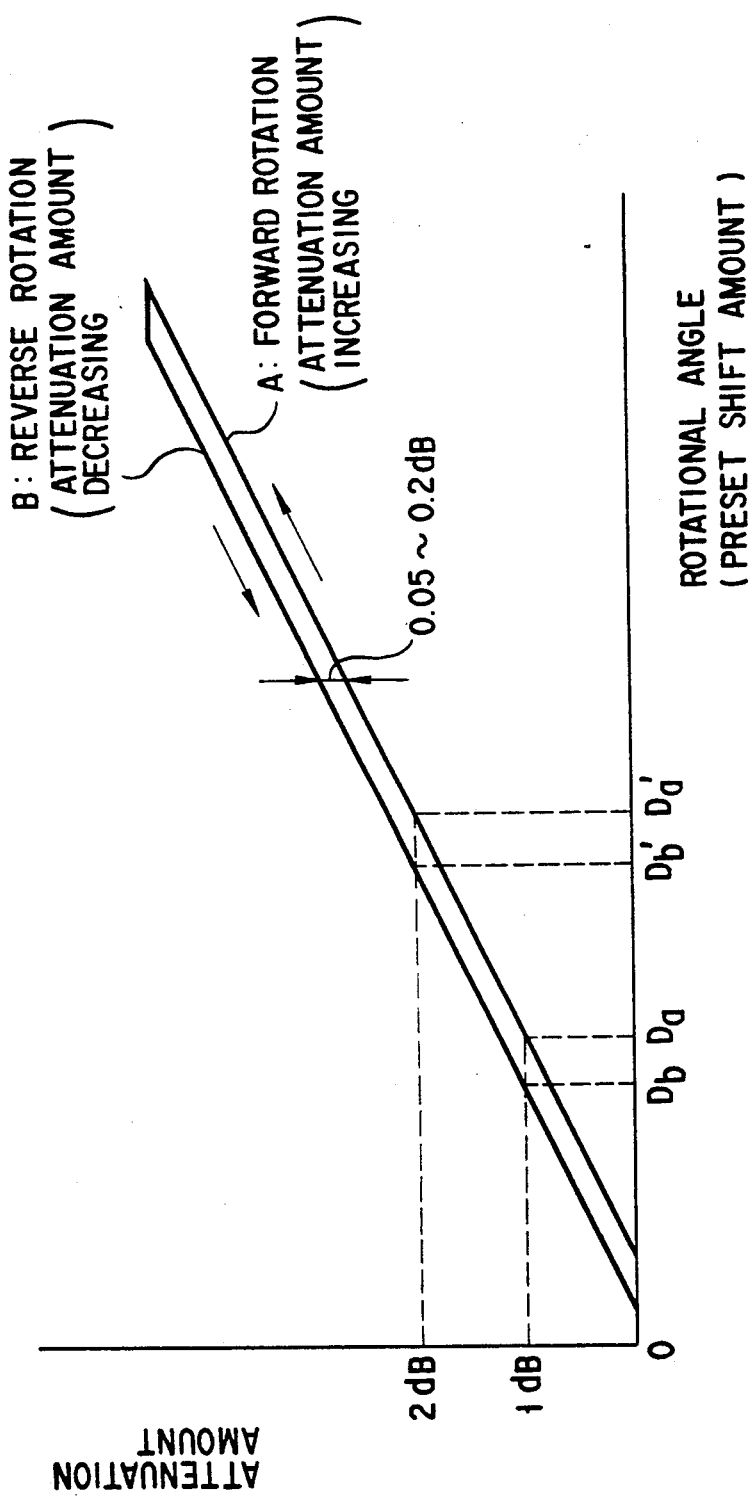
FIG. 33 is a graph showing a relationship between a preset angle and an attenuation amount obtained when an attenuation filter of an optical attenuator having a backlash in a drive system of the attenuation filter is continuously rotated in the forward direction, and a relationship between a preset angle and an attenuation amount obtained when the attenuation filter is continuously rotated in the reverse direction.

An optical attenuator 20 according to the fifth embodiment is different from the optical attenuator 10 of the first embodiment described above in the arrangements of control units 29A and 29B having a memory section 26, operation control sections 27A and 27B, and converting sections 28A and 28B, respectively. More specifically, the memory section 26 stores rotational angle data (indicating a preset shift amount) corresponding to attenuation amounts in units of rotational directions (forward and reverse rotations), as shown in FIG. 33. This data is measured in advance in units of the continuous attenuation filters 2 and 3 to be used by actually operating the filters 2 and 3. The operation control section 27A has a discriminating section 27a1 and a control section 27b1. Operation control section 27B is constructed identically to operation control section 27a1. The discriminating section 27a1 discriminates increases/decreases in attenuation amounts of the continuous attenuation filters 2 and 3, respectively, by comparing a preset value of the setting section 1 and a current attenuation amount. The control section 27b1 read corresponding rotational angle data from the memory section 26 based on the discrimination results and output control signals to the converting section 28A. The continuous attenuation filters 2 and 3 are rotated by driving motors 4A and 4B in accordance with signals supplied from the converting sections 28A and 28B based on the control signals. For example, assume that the setting section 1 sets to increase the attenuation amount of the first continuous attenuation filter 2 by 1 dB and to decrease the attenuation amount of the second continuous attenuation filter 3 by 1 dB. Then, the operation control sections 27A and 27B read rotational angle data Da corresponding to 1 dB of an increase, indicated by a line A in FIG. 33, in attenuation amount of the first continuous attenuation filter 2 which increases the attenuation amount, and rotational angle data Db corresponding to 1 dB of a decrease, indicated by a line B in FIG. 33, in attenuation amount of the second continuous attenuation filter 3 which decreases the attenuation amount. The continuous attenuation filters 2 and 3 are rotated by the motors 4A and 4B in accordance with the readout rotational angle data Da and Db, respectively, to reach angular positions corresponding to the rotational angle data.

In the process of rotational control for the continuous attenuation filters 2 and 3 described above, the preset wavelengths are subjected to correction calculation by using two reference wavelengths in the same manner as in the first embodiment.

In the fifth embodiment described above, the memory section 26 stores the rotational angle data (refer to the lines A and B of FIG. 33) corresponding to two different attenuation amounts for cases in which the attenuation amount is increased/decreased by rotating the motors 4A and 4B in the forward/reverse directions. Therefore, when the continuous attenuation filters 2 and 3 are actually rotated by the motors to obtain desired attenuation amounts, no special drive operation is required for removing the influence of the forward/reverse rotations, no large instantaneous change occurs in attenuation amount in the process of obtaining the desired attenuation amount, a smooth attenuation characteristic can be obtained, and the desired attenuation amount can be reached quickly.

FIG. 13 shows an arrangement of continuous attenuation filters of an optical attenuator according to the sixth embodiment of the present invention.

The optical attenuator according to the sixth embodiment has three continuous attenuation filters 30, 31, and 32. The two continuous attenuation filters 30 and 31 are controlled as a pair in order to widen a variable range of the attenuation amount. The pair of two continuous attenuation filters 30 and 31 and the remaining continuous attenuation filter 32 are controlled so that their ratios of rotational angles coincide with each other. More specifically, in the period A of FIGS. 3A to 3C, when the pair of two filters 30 and 31 and one filter 32 are controlled to rotate in directions of opposite attenuation amounts, if the pair of two filters 30 and 31 are rotated in units of 1° in a direction to increase the attenuation amount, the remaining filter 32 is rotated in units of 2° in a direction to decrease the attenuation amount.

Of the pair of two continuous attenuation filters 30 and 31, one filter 30 (31) may not be operated but stopped.

Figure 14:
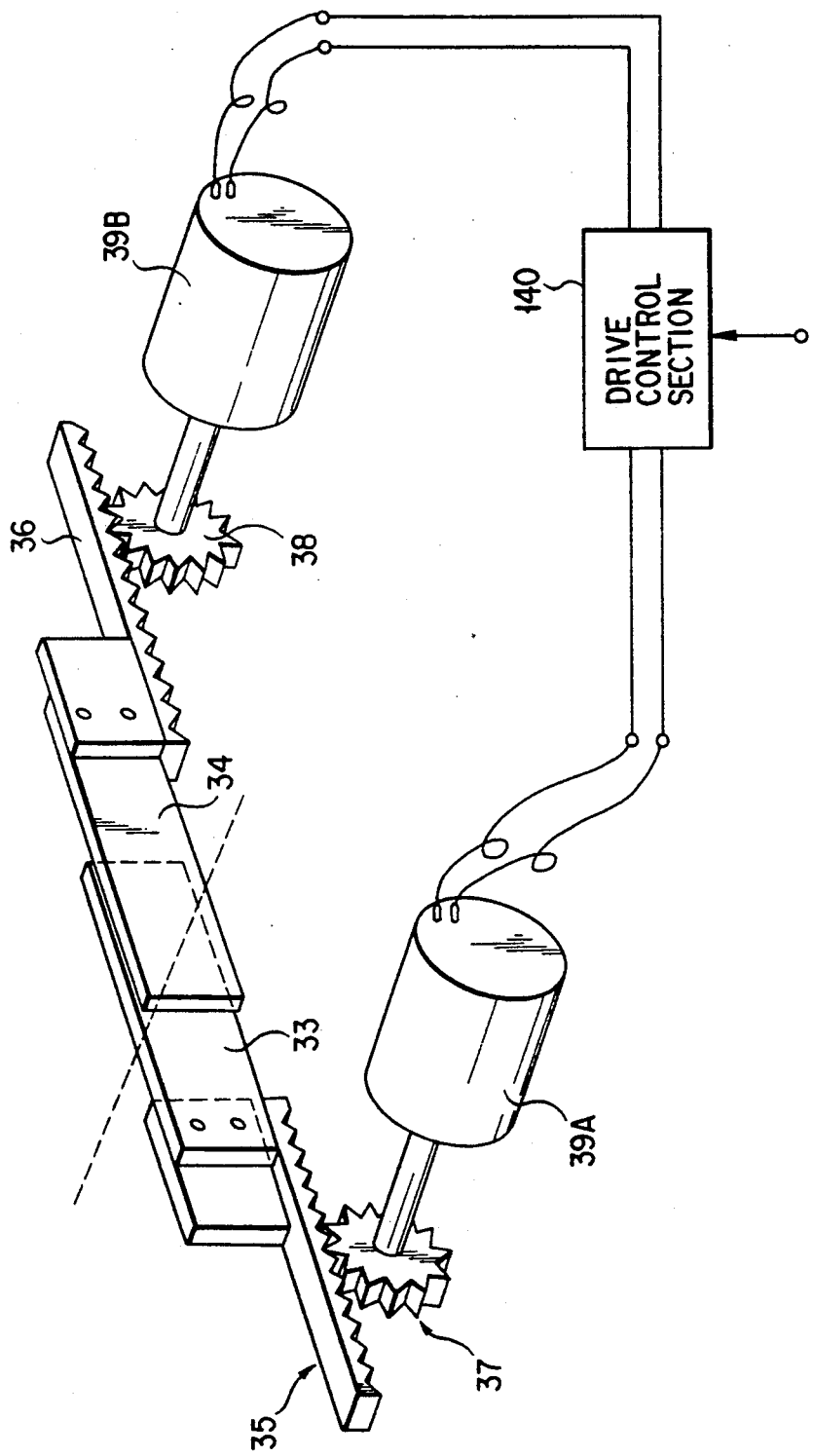
FIG. 14 shows an arrangement of continuous attenuation filters of an optical attenuator according to the seventh embodiment of the present invention.

FIG. 14 shows an arrangement of continuous attenuation filters of an optical attenuator according to the seventh embodiment of the present invention.

In the embodiments described above, the respective disc-shaped continuous attenuation filters are controlled to rotate. In contrast to them, in the optical attenuator according to the seventh embodiment of the present invention, two elongated plate-like continuous attenuation filters 33 and 34 are linearly moved to be parallel to each other by racks 35 and 36, pinions 37 and 38, motors 39A and 39B, and a drive control section 140 so as to partially overlap each other. A metal film is formed on the surface of each of the continuous attenuation filters 33 and 34 whose attenuation amount monotonously changes along the moving direction.

In the seventh embodiment, although the continuous attenuation filters 33 and 34 need a space in the longitudinal direction, their widthwise space can be greatly decreased when compared to the rotating disc-shaped continuous attenuation filters. Therefore, the types of filters can be efficiently selected in accordance with the internal space of the apparatus body. The drive control section 140 controls the shift amounts of the respective filters 33 and 34 as in the embodiments described above.

FIG. 15 and FIGS. 16A, 16B, and 16C are a view and graphs for explaining the principle of the optical attenuator according to the present invention, in which FIG.

15 shows an arrangement of continuous attenuation filters used in the first to sixth embodiments of the present invention, and FIGS. 16A, 16B, and 16C are graphs for showing the operations of the optical attenuator when the attenuation amount is to be increased by using the continuous attenuation filters of FIG. 15

As is apparent from FIGS. 16A to 16C, when the continuous attenuation filters are merely caused to overrun in a direction to increase the attenuation amount and are then returned to obtain preset attenuation amounts, the attenuation amount changes instantaneously in the process of changing the attenuation amount to a desired level. Hence, in the optical attenuator according to any of the embodiments described above, this instantaneous change in attenuation amount is decreased to obtain a substantially smooth attenuation characteristic.

As has been described in the first to seventh embodiments, according to the optical attenuators of the present invention, in the process of changing the attenuation amount to a desired level, the influence of the backlash can be removed, and an instantaneous change in attenuation amount is decreased, thereby obtaining a substantially smooth attenuation characteristic.

Also, according to the optical attenuator of the present invention, movements of the first and second attenuation filter units are controlled so as not to exceed a desired attenuation amount in the process if the attenuation amount is to be increased, and so as not to decrease the attenuation amount below a desired attenuation amount in the process if the attenuation amount is to be decreased. Therefore, an instantaneous change in attenuation amount can be removed in the process of changing the attenuation amount to the desired level.

According to the optical attenuator of the present invention, the final movements of the respective attenuation filter units in opposite directions are controlled to synchronize. Therefore, when the attenuation amount is to be decreased, the space required for the movements of the respective filters can be minimized. Thus, in the process of changing the attenuation amount to a desired level, the influence of the backlash can be completely removed and an instantaneous change in attenuation amount is removed, thereby constantly obtaining a smooth attenuation characteristic.

According to the optical attenuator of the present invention, the widthwise space of the attenuation plate constituting the attenuation filter unit can be minimized, and either the plate-like attenuation filter unit or the disc-shaped attenuation filter unit can be efficiently selected in accordance with the internal space of the apparatus body.

According to the optical attenuator of the present invention, since both or either one of the first and second attenuation filter units comprises two or more filter members, the variable range of the attenuation amount to be changed can be increased.

According to the optical attenuator of the present invention, an attenuation filter unit for removing the influence of the backlash need not be driven, and an instantaneous change in attenuation amount does not occur in the process of changing the attenuation amount to a desired level, and a smooth attenuation characteristic can be obtained. Therefore, the attenuation amount can be quickly changed to the desired level.

Still other embodiments of the present invention will be described.

Figure 17:
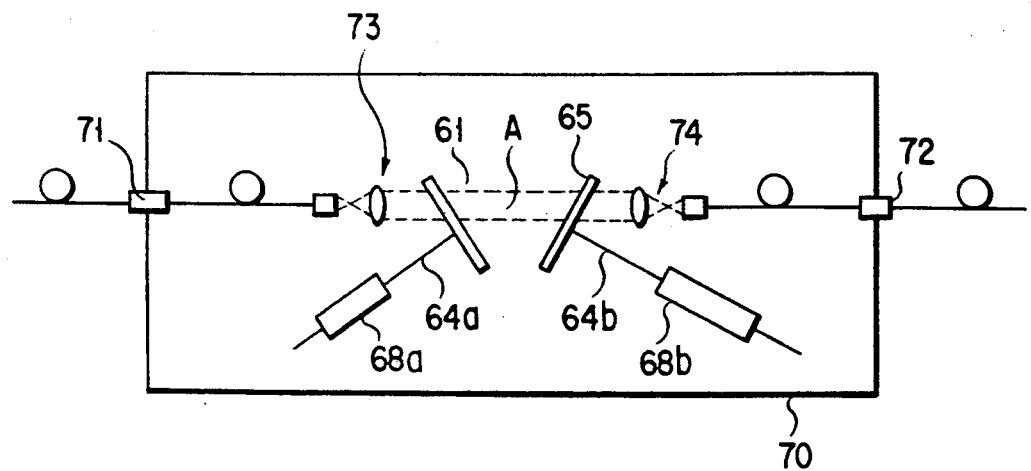
FIG. 17 is a plan view showing an arrangement of an optical attenuator according to the eighth embodiment of the present invention.

FIG. 17 shows an arrangement of an optical attenuator according to the eighth embodiment of the present invention.

Figure 18:
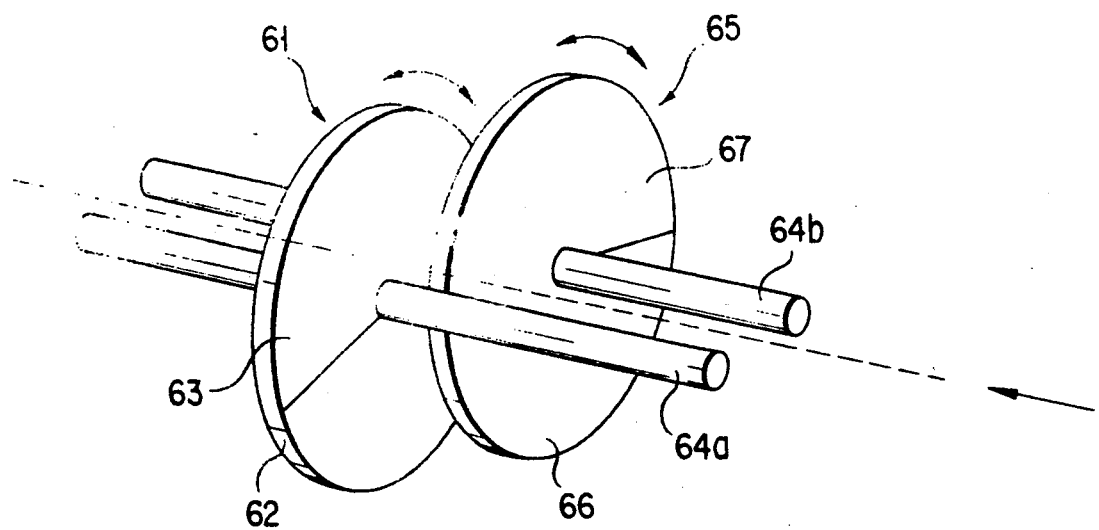
FIG. 18 is a perspective view showing an arrangement of variable attenuation filters provided to the optical attenuator of FIG. 17.

In the eighth embodiment, the attenuator comprises a continuous variable attenuation filter 61 and a step variable filter 65 shown in the perspective view of FIG. 18.

In the filters 61 and 65, metal films 63 and 67 whose transmittances change continuously in the circumferential direction are formed on glass substrates 62 and 66, respectively.

The continuous variable attenuation filter 61 has continuous attenuation amounts of, e.g., 0 to 20 dB, of which a range of 0 to 15 dB is used. The step variable attenuation filter 65 has continuous variable attenuation amounts of 0 to 20 dB, of which amounts of 5, 10, and 15 (db) which change every 5 dB are used in a stepwise manner, as will be described later.

These filters 61 and 65 have drive shafts 64a and 64b at their central portions, respectively. The drive shafts 64a and 64b can be rotated in a manner to be described later by drive motors 68a and 68b which are controlled by a control section 75 to be described later.

The filters 61 and 65 are arranged in an optical axis A in the central portion of a box 70 to be inclined at predetermined angles. The optical axis A is collimated by lenses 73 and 74 between incident- and exit-side connectors 71 and 72.

Figure 19:
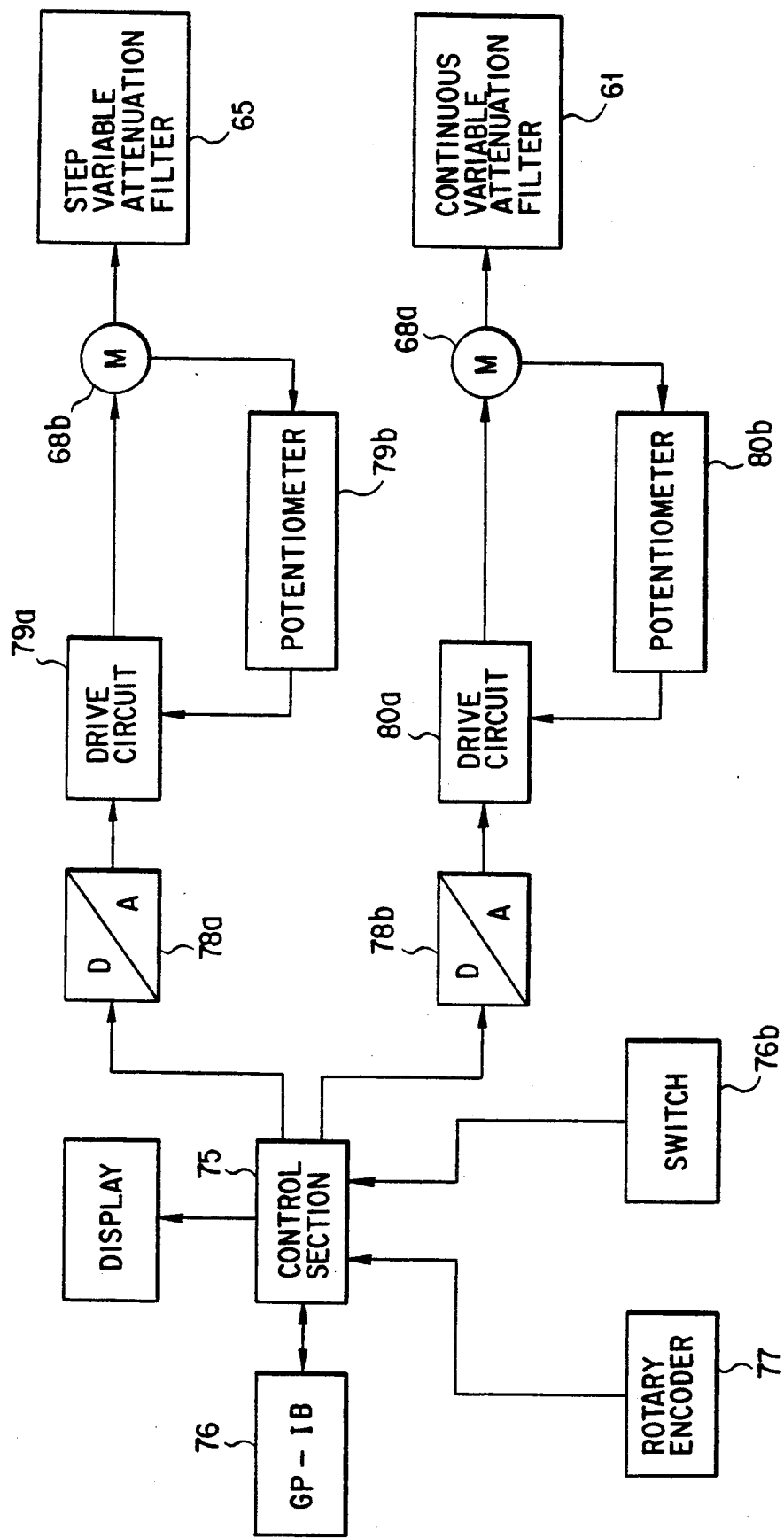
FIG. 19 is a block diagram showing an electrical arrangement of the optical attenuator of FIG. 17.

FIG. 19 is a block diagram showing an electrical arrangement of the optical attenuator of FIG. 17.

A preset attenuation amount value set by an external input 76a, e.g., a GP-IB, a switch 76b, or a rotary encoder 77 constituting an attenuation amount scale plate is input to a control section 75 comprising a CPU. The control section 75 performs an operation for controlling the filters 61 and 65 in a manner to be described later. Drive motors 68a and 68b are driven through D/A converters 78a and 78b, drive circuits 79a and 80a, and position controlling potentiometers 79b and 80b.

Rotational control of the filters 61 and 65 performed by the control section 75 will be described.

Figure 20A:
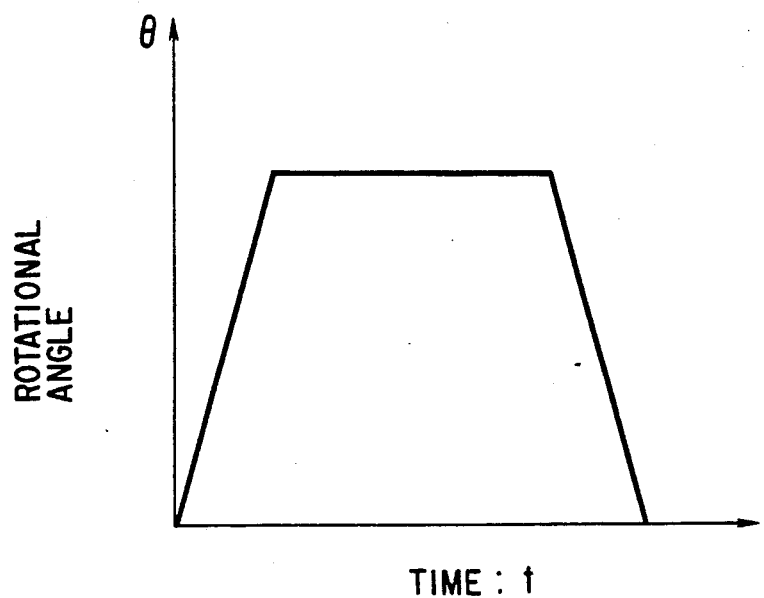
FIGS. 20A and 20B are graphs respectively showing the operation pattern and response characteristic of the variable attenuation filter.
Figure 20B:
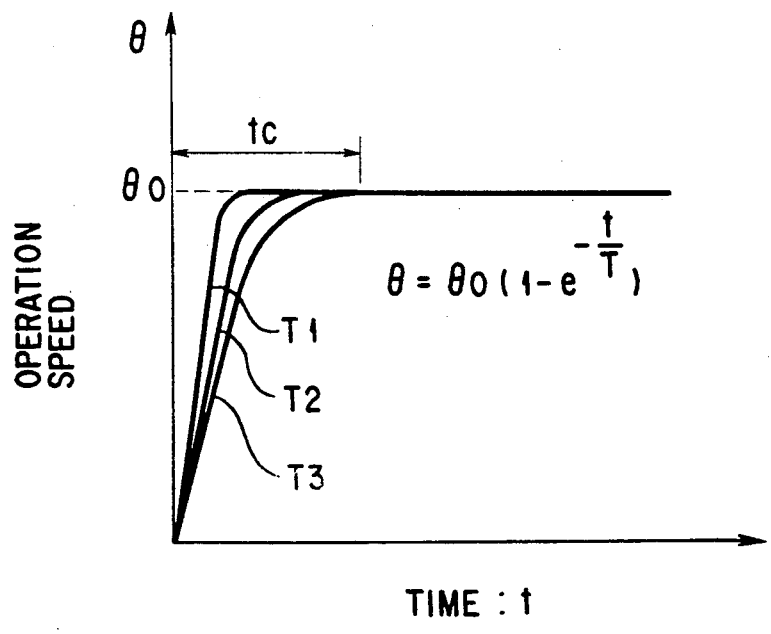

A general operation pattern of a drive unit is a trapezoidal drive pattern as shown in FIG. 20A. However, even if a control voltage is applied linearly, a transition response of a time-lag system of the first order occurs because of the influence of winding inductances of the drive motors 68a and 68b constituting the drive unit. Thus, when driving as shown in FIG. 20A is performed, the relationship between time and the rotational angle of the response characteristic changes exponentially as shown in FIG. 20B. This relationship can be represented as follows:

$$\text{rotational angle}: \theta = \theta_0 (1 - e^{-t/T})$$

where $\theta_0$ is a transfer rotational angle, T is a time constant, and t is time.

When the transfer rotational angle $\theta_0$ is decreased, an input voltage can be decreased, and the time constant T as an influence of the wiring inductance of the drive unit is also decreased. As a result, the influence of the term of the exponential function in the above equation is decreased, and the gradient of the response curve becomes large. Hence, an attenuation amount substantially proportional to time can be obtained. From the above equation, to decrease the influence of the term of the exponential function as well in order to increase the gradient of the response curve, the response time $t_0$ can be apparently decreased.

Figure 21C:
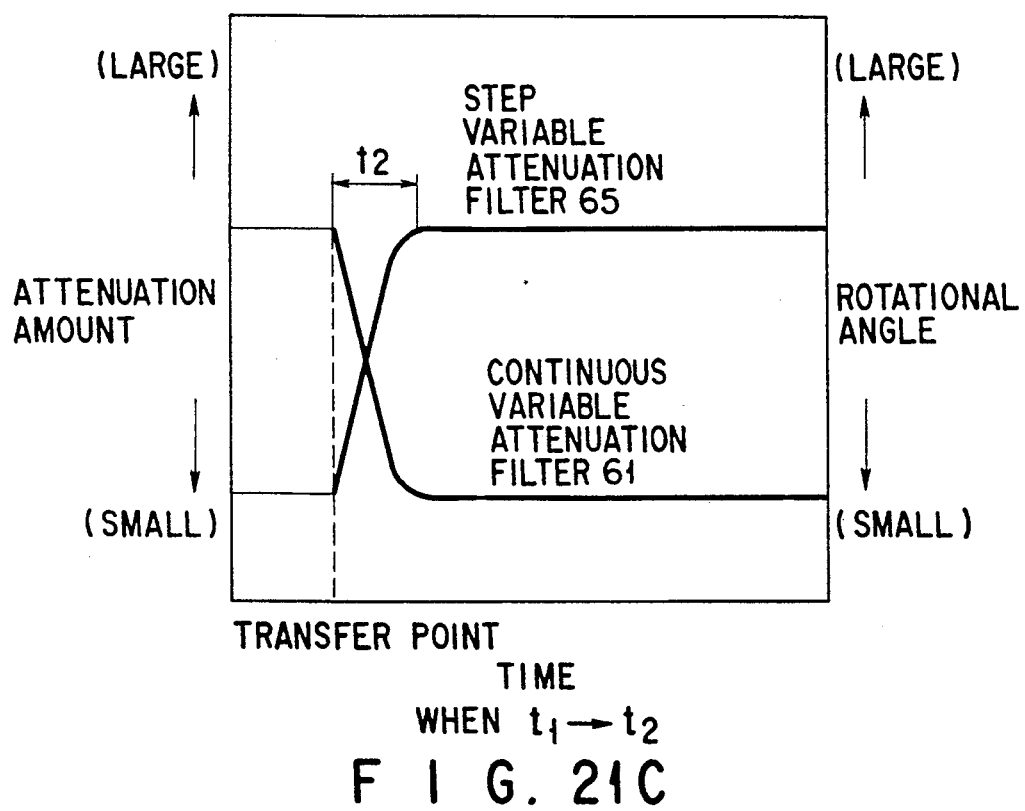

More specifically, since a rotational angle divided by time is a rotational speed, the higher the rotational speed, the better the response. In other words, in FIG. 21A, since the attenuation amount is proportional to the rotational angle, when a change in transfer attenuation amount is changed from $D_1$ to $D_2$, both the continuous variable attenuation filter 61 and the step variable attenuation filter 65 can obtain an attenuation amount substantially proportional to time, as shown in FIG. 21B.

When a response time is changed from $t_1$ to $t_2$, both the continuous variable attenuation filter 61 and the step variable attenuation filter 65 can obtain an attenuation amount substantially proportional to time.

When the two filters 61 and 65 are used, the transfer point occurs first upon transfer of the attenuation amount from 14.5 to 15 dB, as shown in FIG. 22A. Rotational angle control for the filters 61 and 65 must be performed relative to each other so as not to a cause level variation.

For this purpose, a transfer point is provided between 14.5 dB and 15 dB. When a reciprocal ratio of the ratio of the attenuation amount distribution of the continuous variable attenuation filter 61 to that of the step variable attenuation filter 65 is controlled and a ratio of rotational speeds of the drive shafts 64a and 64b is controlled from the reciprocal ratio of the ratio of the change in transfer attenuation amount, the level variation can be eliminated.

In this embodiment, the changes in transfer attenuation amounts are set to 4.9 dB and 5 dB at the transfer points of the continuous variable attenuation filter 61 and the step variable attenuation filter 65, respectively. The ratio of these changes in transfer attenuation is 0.98 : 1. Since the ratios in attenuation amount distribution of the two filters 61 and 65 are the same, if the ratio of rotational angles of the drive shafts 64a and 64b is set to 1 : 0.98 which is a reciprocal ratio of the ratio of changes in transfer attenuation amounts, no level variation occurs.

FIG. 22B shows changes in attenuation amounts of the filters 61 and 65 at the transfer point. As shown in FIG. 22B, when the attenuation amount is changed from 14.9 to 15 dB, the total attenuation amount obtained by combining the continuous variable attenuation filter 61 and the step variable attenuation filter 65 is transferred smoothly without a level variation.

The next transfer point is present between 19.9 and 20 dB, as shown in FIG. 22A.

The ninth embodiment of the present invention will be described with reference to FIG. 23.

In this embodiment, two step variable attenuation filters 65 and 65' identical to that used in the eighth embodiment are stacked to obtain a step attenuation amount of 10 dB.

Then, the ratio of the attenuation amount of a continuous variable attenuation filter 61 to that of each of step variable attenuation filters 65 and 65' becomes 1 : 2.

In this case, since the ratio of changes in transfer attenuation amounts is 0.98 : 1 at the transfer point, the ratio of rotational speeds of drive shafts 64a and 64b may be set to 2 : 0.98 as a composite ratio of 2 : 1 which is a reciprocal ratio of the ratio of attenuation amount distributions and 1 : 0.98 which is a reciprocal ratio of the ratio of changes in transfer attenuation amounts, thus perform driving.

The tenth embodiment of the present invention will be described with reference to FIG. 24.

In this embodiment, in place of the rotating disc-shaped plates used in the ninth embodiment, attenuation plates 120 and 125 obtained by forming different metal films 123 and 127 on rectangular glass substrates 121 and 126, respectively, continuously from one to the other end are used. One attenuation plate 120 is used as a continuous variable attenuation filter, and the other attenuation plate 125 is used as a step variable attenuation filter. These variable attenuation filters 120 and 125 are mounted in a drive system, e.g., a linear motor, which performs linear movement. When the ratio of shift speeds is obtained as a composite ratio of the reciprocal ratio of the ratio of attenuation amount distributions and a reciprocal ratio of the ratio of changes in transfer attenuation amounts, as in the ninth embodiment, the same effect as that in the ninth embodiment can be obtained.

When the change in transfer attenuation amount is selected and the ratio of rotational speeds of the drive shafts is determined from the ratio of attenuation amounts of the two filters and the ratio of changes in transfer attenuation amounts at the transfer point in this manner, even if the combination of the continuous variable attenuation filter and the step variable attenuation filter may be 15 dB–15 dB (1 : 1), 15 dB–30 dB (1 : 2), 20 dB–40 dB (1 : 2), 1 : 3, and so on, an optical attenuator having a wide attenuation range substantially free from a variation in preset attenuation amount upon level transfer can be obtained.

Figure 25A:
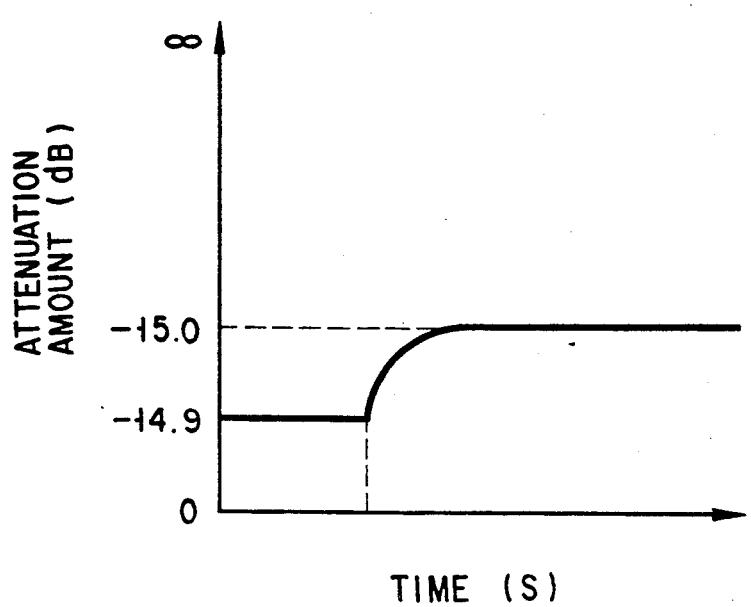
FIGS. 25A and 25B are graphs showing a change in attenuation amount after a transfer point of the optical attenuator according to the eighth embodiment of the present invention and the conventional optical attenuator, respectively.

FIG. 25A shows attenuation amounts near a transfer point between 14.9 dB and 15 dB obtained in an experiment using the attenuator according to the present invention. In this experiment, a 1.3-$\mu$m laser diode (LD) light source was used as the light source. As is shown in FIG. 25A, according to the present invention, a smooth transfer was performed at a transfer point.

Figure 25B:
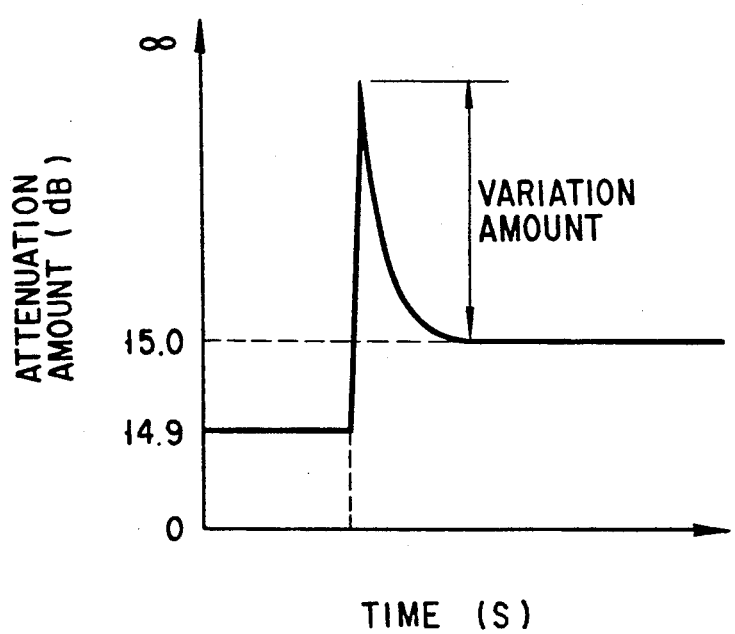
Figure 30:
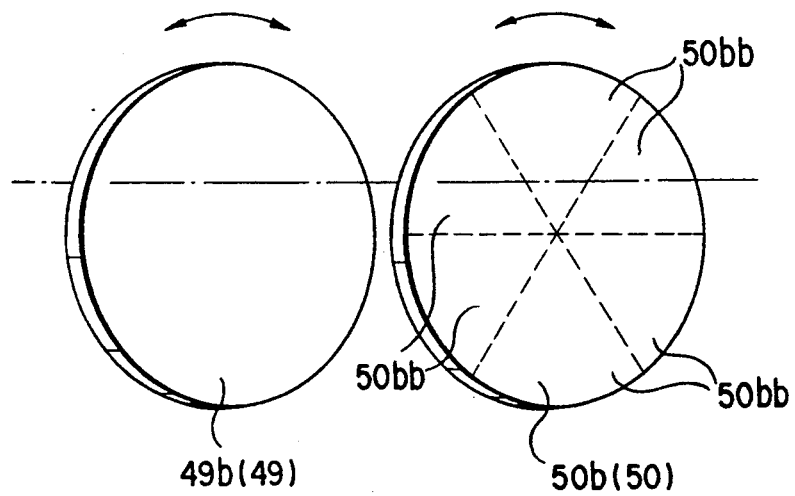
FIG. 30 shows an arrangement of another conventional attenuation filter.
Figure 31:
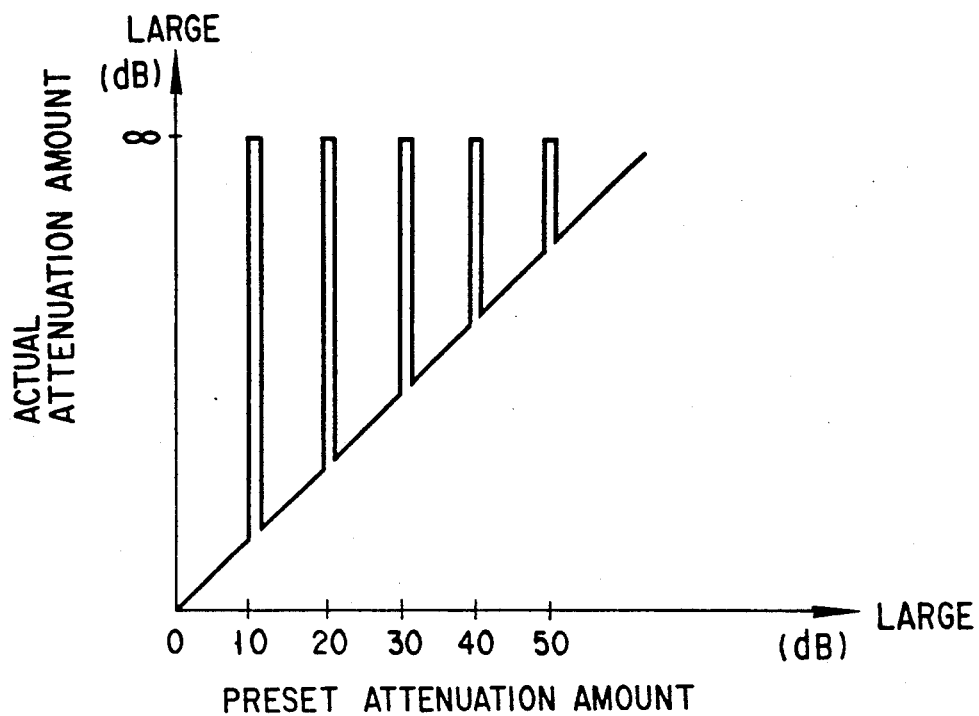
FIG. 31 is a graph showing an attenuation characteristic of the attenuation filter shown in FIG. 29.
Figure 32:
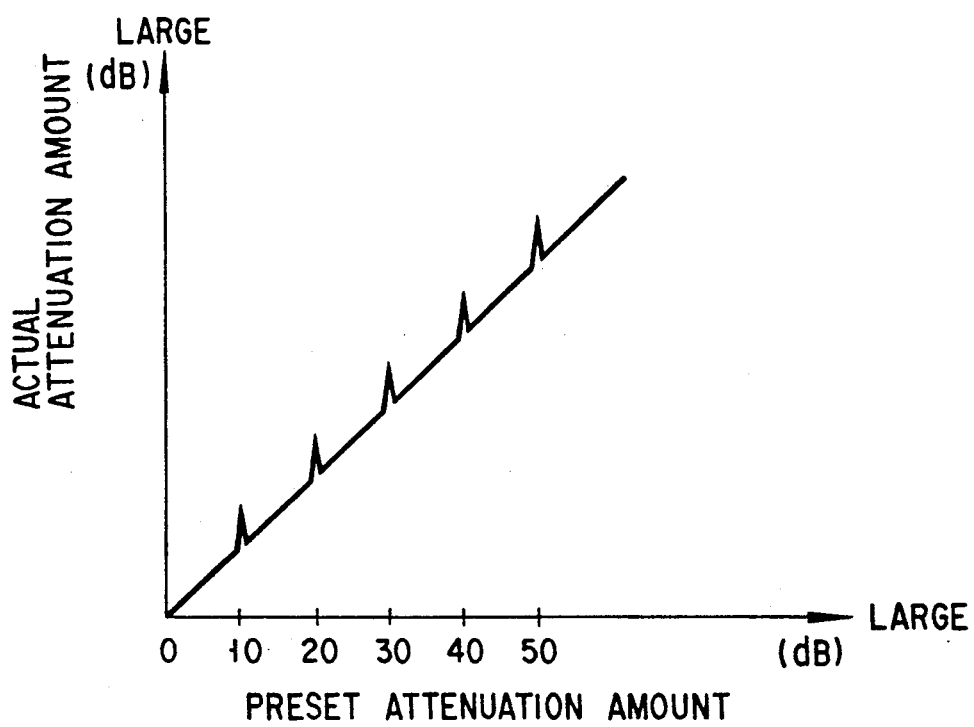
FIG. 32 is a graph showing an attenuation characteristic of the attenuation filter shown in FIG. 30.

FIG. 25B shows attenuation amounts obtained by using a conventional attenuator (FIG. 30). From FIG. 25B, it is apparent that a level variation occurs at a transfer point portion.

Figure 26:
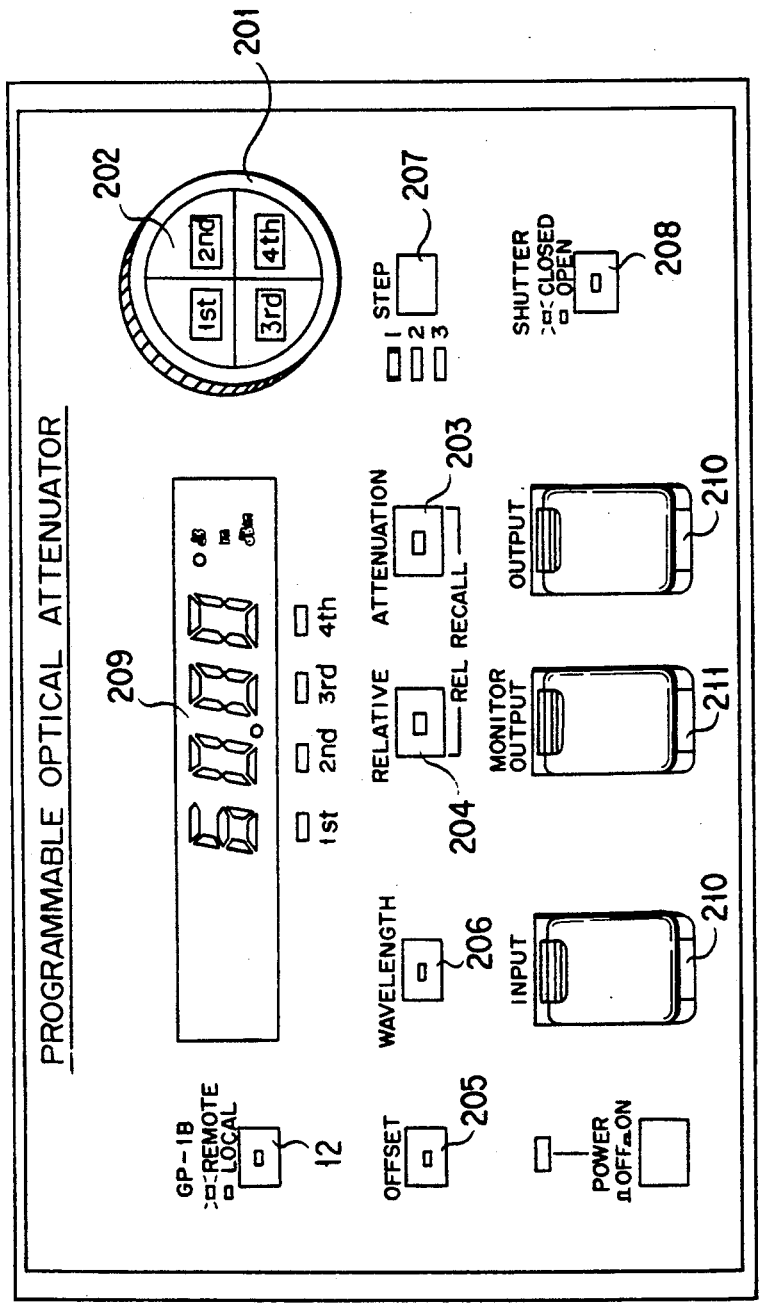
FIG. 26 shows a panel layout when the optical attenuator according to the present invention is fabricated as a programmable optical attenuator.
Figure 29:
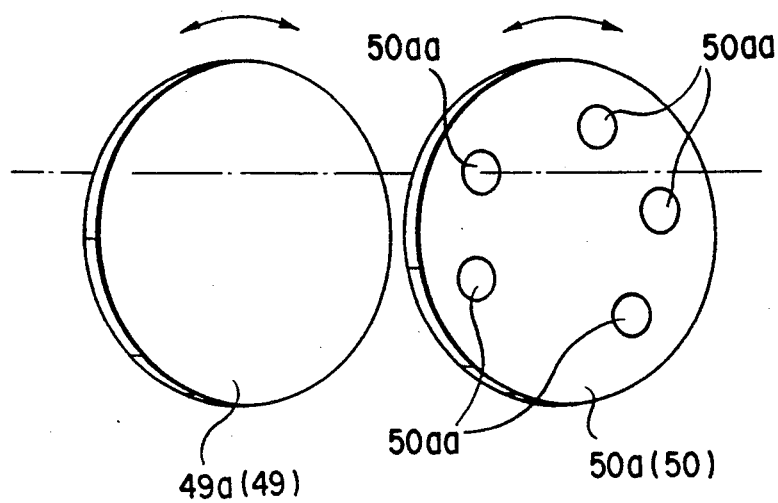
FIG. 29 shows an arrangement of a conventional attenuation filter.

FIG. 26 shows a panel layout when the optical attenuator according to the present invention is fabricated as a programmable optical attenuator.

Referring to FIG. 26,

201: attenuation amount/a wavelength/offset setting dial

202: attenuation amount/wavelength/offset digit setting keys

When the key 202 is depressed, a lamp corresponding to it under a display is turned on.

203: attenuation amount setting key (ATTENUATION)

204: attenuation amount relative display key (RELATIVE)

The relative and attenuation amount setting keys are depressed simultaneously to display a reference preset value of the relative value.

205: offset setting key (OFFSET)

Capable of changing an offset value within a range of ±99.99 dB.

Capable of directly reading an output power from the optical attenuator by inputting a light source output value and a loss value of the optical attenuator.

206: wavelength setting key (WAVELENGTH)

Capable of switching the wavelength between 1310 and 1551 nm upon key depression.

Capable of setting in units of 1 mm by a rotary encoder.

207: step width setting key (STEP)
Capable of setting a multiple of 1, 2, and 5 when an attenuation amount, a wavelength, or an offset value is to be changed.
208: internal shutter open/close key (SHUTTER)
209: attenuation amount/wavelength/offset value display
210: optical input/output sections (INPUT, OUTPUT)
211: optical monitor output section (MONITOR OUTPUT)
212: GP-OB remote cancel key FIGS. 27A, 27B, and 27C are graphs showing an output characteristic at a preset attenuation amount obtained by the optical attenuator according to the present invention and the conventional optical attenuator.

More specifically, the output characteristic at a preset attenuation amount shown in FIG. 27A of the optical attenuator according to the present invention indicates that, according to the present invention, an optical level can be smoothly set and output without accompanying a short break, i.e., with no short break when compared to those obtained by the conventional optical attenuator. The same effect can be obtained by the optical attenuators according to the first to seventh embodiments described above.

When the optical attenuator according to the present invention is adopted as a variable level optical attenuator in error rate measurement as shown in FIG. 34, an error which is conventionally caused by the level variation and an inconvenience of an operation stop because of the malfunction of the protecting function of the measuring system can be eliminated without creating a special control program.

Referring to the system shown in FIG. 34, when an optical pulse corresponding to an electrical pulse signal from a pulse pattern generator 53 is supplied from an E/O generator 54 to the optical attenuator 52, the optical pulse is guided to the error detector 57 as the electrical pulse signal again via an optical directional coupler 55, the optical repeater 51, and an O/E converter 56. When this electrical pulse signal is compared to the original electrical pulse signal supplied from the pulse pattern generator 53, an error rate of the optical repeater 51 is measured.

As has been described above in the eighth to tenth embodiments, according to the optical attenuators of the present invention, attenuation amount transfer can be smoothly performed with no short break without a level variation at a transfer point.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An optical attenuator apparatus comprising:
   incident means for guiding light to be attenuated to a predetermined optical path;
   first optical attenuation filter means, arranged in the predetermined optical path, for attenuating the light to be attenuated incident through said incident means by a first variable attenuation amount, said first optical attenuation filter means being capable of being driven in forward and reverse directions and having an attenuation characteristic which changes monotonously in both the forward and reverse directions;
   second optical attenuation filter means, arranged in the predetermined optical path, for attenuating, by a second variable attenuation amount, the light which has been transmitted through said first optical attenuation filter means using the first variable attenuation amount, said second optical attenuation filter means being capable of being driven in the forward and reverse directions and having an attenuation amount characteristic which changes monotonously in both the forward and reverse directions;
   optical output means, arranged in the predetermined optical path, for causing light which has been transmitted through said first and second optical attenuation filter means to emerge under a condition using an algebraic sum of the first and second variable attenuation amounts;
   attenuation amount setting means for setting a desired attenuation amount by which the light to be attenuated which is incident through said incident means is attenuated;
   first drive means coupled to drive said first optical attenuation filter means in the forward and reverse directions;
   second drive means coupled to drive said second optical attenuation filter means in the forward and reverse directions; and
   control means for controlling driving directions and driving amounts of said first and second optical attenuation filter means through said first and second drive means in accordance with the desired attenuation amount set by said attenuation amount setting means so that the algebraic sum of the first and second attenuation amounts finally becomes equal to the desired attenuation amount and a variation in attenuation amount is decreased as a whole, thereby providing a smooth attenuation characteristic.

2. An apparatus according to claim 1, wherein said control means includes means for controlling said first and second drive means in order to drive said first optical attenuation filter means in one direction and thereafter in an opposite direction by said first drive means and said second optical attenuation filter means in a specific direction and thereafter in the same direction by said second drive means, thereby providing the desired attenuation amount.

3. An apparatus according to claim 1, wherein said control means includes means for controlling said first and second drive means in order to drive said first optical attenuation filter means in one direction and thereafter in an opposite direction by said first drive means and said second attenuation filter means in a specific direction, in a direction opposite to that of said first attenuation filter means, and thereafter in a direction opposite thereto by said second drive means, thereby providing the desired attenuation amount.

4. An apparatus according to claim 1, wherein said control means includes means for controlling said first and second attenuation filter means such that the attenuation amount will not exceed the desired amount when the attenuation amount is to be increased, and such that the attenuation amount will not be decreased below the desired amount when the attenuation amount is to be decreased.

5. An apparatus according to claim 1, wherein each of said first and second optical attenuation filter means comprises a rotary disc obtained by forming a metal film on a transparent substrate such that a transmittance thereof changes continuously, and final driving operations in opposing directions are controlled to be synchronized.

6. An apparatus according to claim 1, wherein each of said first and second optical attenuation filter means comprises a linearly movable plate obtained by forming a metal film on a transparent substrate such that a transmittance thereof changes continuously.

7. An apparatus according to claim 1, wherein at least one of said first and second optical attenuation filter means includes a plurality of optical attenuation filter members.

8. An apparatus according to claim 1, wherein said control means includes a memory section, a memory section for storing in advance data indicating a relationship between an attenuation amount and a shift amount of said first and second optical attenuation filter means for attenuation amount increasing and decreasing directions in units of said first and second optical attenuation filter means, a discriminating section for discriminating whether a desired attenuation amount is in the increasing or decreasing direction from a current attenuation amount, and a control section for controlling movements of said first and second optical attenuation filter means based on a moving direction of said first and second optical attenuation filter means discriminated by said discriminating section, the attenuation amount stored in said memory section, and shift amount data of said first and second optical attenuation filter means.

9. An optical attenuator apparatus comprising:
first and second attenuation filter units in which attenuation amounts change monotonously with respect to drive directions;
first and second drive units for respectively driving said first and second attenuation filter units and attenuating light transmitted through said first and second attenuation filter units by a desired attenuation amount; and
a control unit for controlling said first and second drive units in order to drive said first attenuation filter unit in one direction and thereafter in an opposite direction by said first drive unit and said second attenuation filter unit in a specific direction and thereafter in the same direction by said second drive unit, thereby providing the desired attenuation amount.

10. An apparatus according to claim 9, wherein movements of said first and second attenuation filter units are controlled such that the attenuation amounts thereof will not exceed the desired amount when the attenuation amounts are to be increased, and such that the attenuation amounts thereof will not be decreased below the desired amount when the attenuation amounts are to be decreased.

11. An apparatus according to claim 9, wherein each of said first and second attenuation filter units comprises a rotary disc on which a metal film is formed such that a transmittance thereof changes continuously, and final movements in opposing directions are controlled to be synchronized.

12. An apparatus according to claim 9, wherein each of said first and second attenuation filter units comprises a linearly movable plate on which a metal film is formed such that a transmittance thereof changes continuously.

13. An optical attenuator apparatus comprising:
first and second attenuation filter units in which attenuation amounts change monotonously with respect to drive directions;
first and second drive units for respectively driving said first and second attenuation filter units and attenuating light transmitted through said first and second attenuation filter units by a desired attenuation amount; and
a control unit for controlling said first and second drive units in order to drive said first attenuation filter unit in one direction and thereafter in an opposite direction by said first drive unit and said second attenuation filter unit in a specific direction, in a direction opposite to that of said first attenuation filter unit, and thereafter in a direction opposite thereto by said second drive unit, thereby providing the desired attenuation amount.

14. An apparatus according to claim 9, wherein at least one of said first and second attenuation filter units comprises at least two plates.

15. An optical attenuator apparatus comprising:
first and second attenuation filter units in which attenuation amounts change monotonously with respect to drive directions;
first and second drive units for respectively driving said first and second attenuation filter units and attenuating light transmitted through said first and second attenuation filter units by a desired attenuation amount;
memory means for storing in advance data indicating a relationship between an attenuation amount and a shift amount of said first and second attenuation filter units for attenuation amount increasing and decreasing directions in units of said first and second optical attenuation filter units, discriminating means for discriminating whether a desired attenuation amount is in the increasing or decreasing direction from a current attenuation amount; and
control means for controlling movements of said first and second optical attenuation filter units based on a moving direction of said first and second attenuation filter units discriminated by said discriminating means, the attenuation amount stored in said memory means, and shift amount data of said first and second attenuation filter units.

16. An optical attenuator apparatus in which an optical attenuation amount thereof is changed such that a plurality of optical attenuation filters for transmitting light therethrough are moved relative to each other or independently of each other, comprising:
a continuous variable attenuation filter in which attenuation filters whose attenuation amounts change continuously are used as said optical attenuation filters;
a step variable attenuation filter in which attenuation filters whose attenuation amounts change continuously are employed to use only stepwise attenuation amount portions of said attenuation filters; and
control means for performing control to obtain a preset predetermined attenuation amount by a combination of said continuous variable attenuation filter and said step variable attenuation filter, and controlling relative rotational speeds of said continuous variable attenuation filter and said step variable attenuation filter in accordance with a ratio of attenuation amount distributions of said continuous variable attenuation filter and said step variable attenuation filter and a ratio of transfer attenuation change amounts thereof at transfer points, when changing an attenuation filter of said step variable attenuation filter.

* * * * *